United States Patent
Nishida et al.

(10) Patent No.: US 9,641,875 B2
(45) Date of Patent: May 2, 2017

(54) VIDEO SIGNAL TRANSMITTING DEVICE, VIDEO SIGNAL RECEIVING DEVICE, AND RECORDING MEDIUM

(71) Applicant: NIPPON HOSO KYOKAI, Tokyo (JP)

(72) Inventors: Yukihiro Nishida, Tokyo (JP); Ryohei Funatsu, Tokyo (JP); Yuichi Kusakabe, Tokyo (JP); Takayuki Yamashita, Tokyo (JP); Makoto Okui, Tokyo (JP); Takuji Soeno, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 14/425,430

(22) PCT Filed: Sep. 4, 2013

(86) PCT No.: PCT/JP2013/073819
§ 371 (c)(1),
(2) Date: Mar. 3, 2015

(87) PCT Pub. No.: WO2014/038597
PCT Pub. Date: Mar. 13, 2014

(65) Prior Publication Data
US 2015/0237382 A1    Aug. 20, 2015

(30) Foreign Application Priority Data

Sep. 4, 2012 (JP) ................................ 2012-194576
Apr. 24, 2013 (JP) ................................ 2013-091689

(51) Int. Cl.
*H04N 21/2365* (2011.01)
*H04N 21/236* (2011.01)
(Continued)

(52) U.S. Cl.
CPC ........... *H04N 21/2365* (2013.01); *H04N 5/38* (2013.01); *H04N 5/4401* (2013.01);
(Continued)

(58) Field of Classification Search
CPC ............ H04N 21/23602; H04N 7/015; H04N 21/2365; H04N 21/4342; H04N 7/01; H04N 7/0125; H04N 21/4347; H04N 21/4381; H04N 5/08
See application file for complete search history.

(56) References Cited

U.S. PATENT DOCUMENTS

2009/0290634 A1    11/2009    Yamashita
2011/0205247 A1     8/2011    Yamashita
(Continued)

FOREIGN PATENT DOCUMENTS

EP    2139236 A1    12/2009
JP    H06-209435 A    7/1994
(Continued)

OTHER PUBLICATIONS

Decision of Allowance with English Language Translation dated Jan. 17, 2016, issued in KR patent application No. 10-2015-7006936 (6 pages).
(Continued)

*Primary Examiner* — Hai V Tran
(74) *Attorney, Agent, or Firm* — Drinker Biddle & Reath LLP

(57) ABSTRACT

In a video signal transmitting device, a basic image generation unit extracts, for each of the color signal component, pixels constituting a frame of the color signal component at a uniform interval two-dimensionally and two-dimensionally arranges the extracted pixels in a prescribed arrangement to generate a prescribed number of color signal basic images. A basic stream generation unit extracts, for each of the color signal basic images, pixels of the color signal basic image generated by the basic image generation unit in a prescribed sequence to generate a basic stream. A link signal generation unit synthesizes a prescribed number of basic streams in the same or different color signal components generated by the basic stream generation unit, encodes
(Continued)

bit-length units of the synthesized basic streams to a different bit length, and generates a link signal having a prescribed speed.

12 Claims, 35 Drawing Sheets

(51) Int. Cl.
| | | |
|---|---|---|
| H04N 21/438 | (2011.01) | |
| H04N 21/434 | (2011.01) | |
| H04N 21/2343 | (2011.01) | |
| H04N 21/2381 | (2011.01) | |
| H04N 5/38 | (2006.01) | |
| H04N 5/44 | (2011.01) | |

(52) U.S. Cl.
CPC ... *H04N 21/2381* (2013.01); *H04N 21/23602* (2013.01); *H04N 21/234327* (2013.01); *H04N 21/4347* (2013.01); *H04N 21/4381* (2013.01)

(56) References Cited

U.S. PATENT DOCUMENTS

| | | | | |
|---|---|---|---|---|
| 2011/0205428 | A1* | 8/2011 | Yamashita | H04N 21/4347 348/443 |
| 2012/0293710 | A1* | 11/2012 | Yamashita | H04N 7/015 348/445 |

FOREIGN PATENT DOCUMENTS

| | | |
|---|---|---|
| JP | A-2009-521880 | 6/2009 |
| JP | 2010-124245 A | 6/2010 |
| JP | 4645638 B2 | 3/2011 |
| JP | 2011-176635 A | 9/2011 |
| JP | 2012-010014 A | 1/2012 |

OTHER PUBLICATIONS

SMPTE ST 372:2011.
SMPTE ST 424:2012.
SMPTE ST 435-1:2012.
SMPTE ST 435-2:2012.
SMPTE ST 435-3:2012.
SMPTE ST 2036-3:2012.
SMPTE ST 292-1:2012.
Recommendation ITU-R BT.1120-8 (Jan. 2012).
ARIB Standard BTA S-004C, 2009.
International Search Report mailed Nov. 26, 2013 for PCT/JP2013/073819.
Search Report dated Feb. 19, 2016 for European Patent Application No. 13836101.9.
"SMPTE Standard Ultra High Definition Television-Mapping into Single-link or Multi-link 10 Gb/s Serial Signal/Data Interface", IEEE Xplore Digital Library, No. SMPTE 2036-3 Standard: Aug. 1, 2010, pp. 1-22.

* cited by examiner

| SIGNAL FORMAT | COLOR SIGNAL COMPONENTS | | | NUMBER OF SUB-IMAGES N | CONSTITUTION OF THE SUB-IMAGES |
|---|---|---|---|---|---|
| | C1 | C2 | C3 | | |
| 4:4:4 | G | B | R | 12 | G1 G2 B1 B2 R1 R2<br>G3 G4 B3 B4 R3 R4 |
| 4:4:4 | Y | $C_B$ | $C_R$ | 12 | Y1 Y2 $C_B$1 $C_B$2 $C_R$1 $C_R$2<br>Y3 Y4 $C_B$3 $C_B$4 $C_R$3 $C_R$4 |
| 4:2:2 | Y | $C_B$ | $C_R$ | 8 | Y1 Y2 $C_B$1 $C_R$1<br>Y3 Y4 $C_B$3 $C_R$3 |
| 4:2:0 | Y | $C_B$ | $C_R$ | 6 | Y1 Y2 $C_B$1 $C_R$1<br>Y3 Y4 |
| DUAL GREEN | G | B | R | 4 | G1 R2<br>G4 B3 |
| ALFA | α | — | — | 4 | α1 α2<br>α3 α4 |

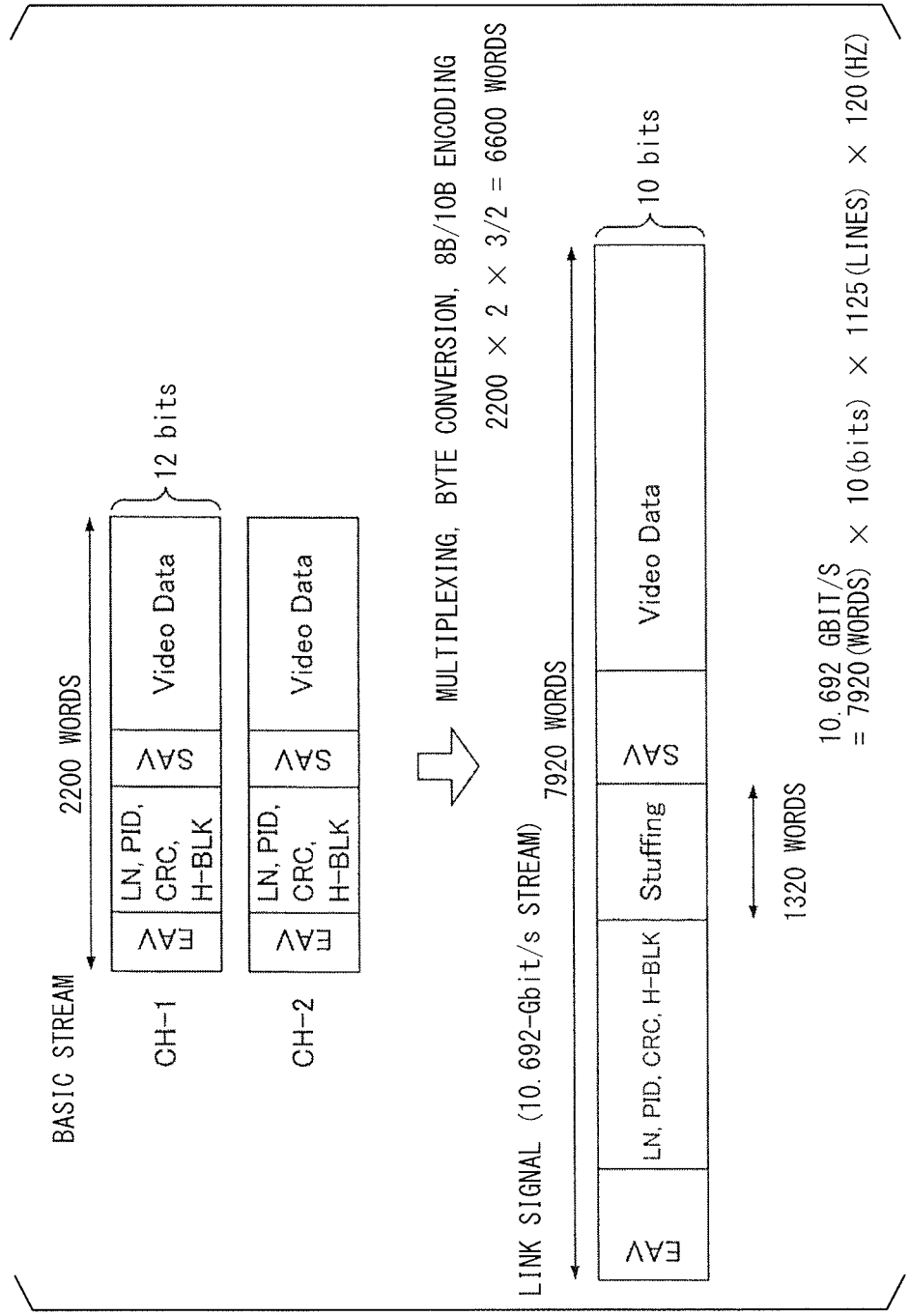

| SIGNAL FORMAT | COLOR SIGNAL COMPONENTS | | | NUMBER OF SUB-IMAGES | NUMBER OF 10.692-Gbit/s LINK SIGNALS | |
|---|---|---|---|---|---|---|
| | C1 | C2 | C3 | | 120Hz | 60Hz |
| 4:4:4 | G | B | R | 12 | 24 | 12 |
| 4:4:4 | Y | $C_B$ | $C_R$ | 12 | 24 | 12 |
| 4:2:2 | Y | $C_B$ | $C_R$ | 8 | 16 | 8 |
| 4:2:0 | Y | $C_B$ | $C_R$ | 6 | 12 | 6 |
| DUAL GREEN | G | B | R | 4 | 8 | 4 |
| ALFA | α | — | — | 4 | 8 | 4 |

| SIGNAL FORMAT | COLOR SIGNAL COMPONENTS | | | NUMBER OF BASIC IMAGES M | CONSTITUTION OF THE SUB-IMAGES |
|---|---|---|---|---|---|
| | C1 | C2 | C3 | | |
| 4:4:4 | G | B | R | 12 | g1 g2 b1 b2 r1 r2<br>g3 g4 b3 b4 r3 r4 |
| 4:4:4 | Y | $C_B$ | $C_R$ | 12 | y1 y2 cb1 cb2 cr1 cr2<br>y3 y4 cb3 cb4 cr3 cr4 |
| 4:2:2 | Y | $C_B$ | $C_R$ | 8 | y1 y2 cb1     cr1<br>y3 y4 cb3     cr3 |
| 4:2:0 | Y | $C_B$ | $C_R$ | 6 | y1 y2 cb1     cr1<br>y3 y4 |
| DUAL GREEN | G | B | R | 4 | g1             r2<br>   g4 b3 |
| ALFA | α | — | — | 4 | a1 a2<br>a3 a4 |

| SIGNAL FORMAT | COLOR SIGNAL COMPONENTS | | | NUMBER OF 10.692-Gbit/s LINK SIGNALS | |
|---|---|---|---|---|---|
| | C1 | C2 | C3 | 120Hz | 60Hz |
| 4:4:4 | G | B | R | 6 | 3 |
| 4:4:4 | Y | $C_B$ | $C_R$ | 6 | 3 |
| 4:2:2 | Y | $C_B$ | $C_R$ | 4 | 2 |
| 4:2:0 | Y | $C_B$ | $C_R$ | 3 | 2 |
| DUAL GREEN | G | B | R | 2 | 1 |
| ALFA | $\alpha$ | — | — | 2 | 1 |

FIG. 40

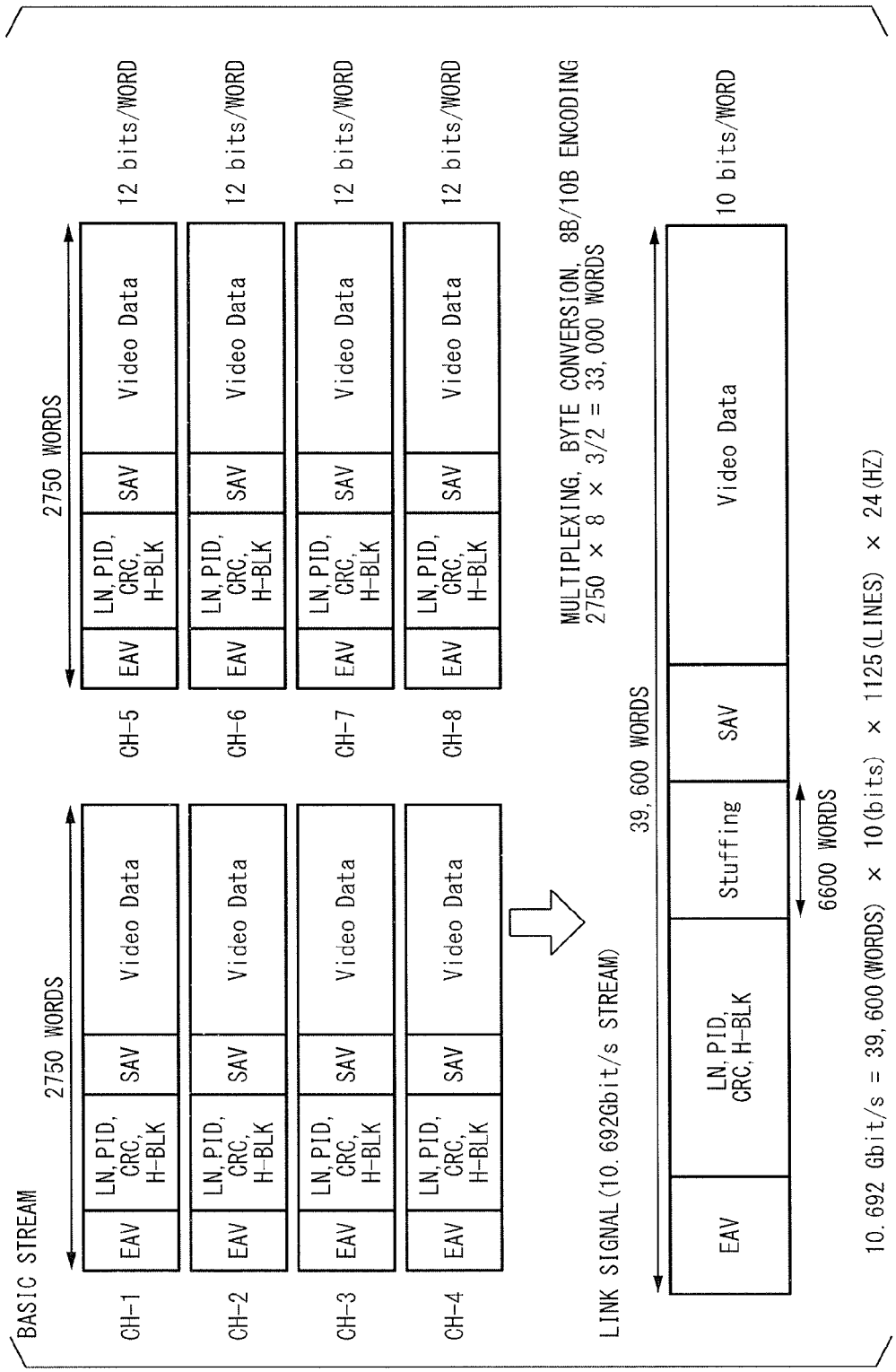

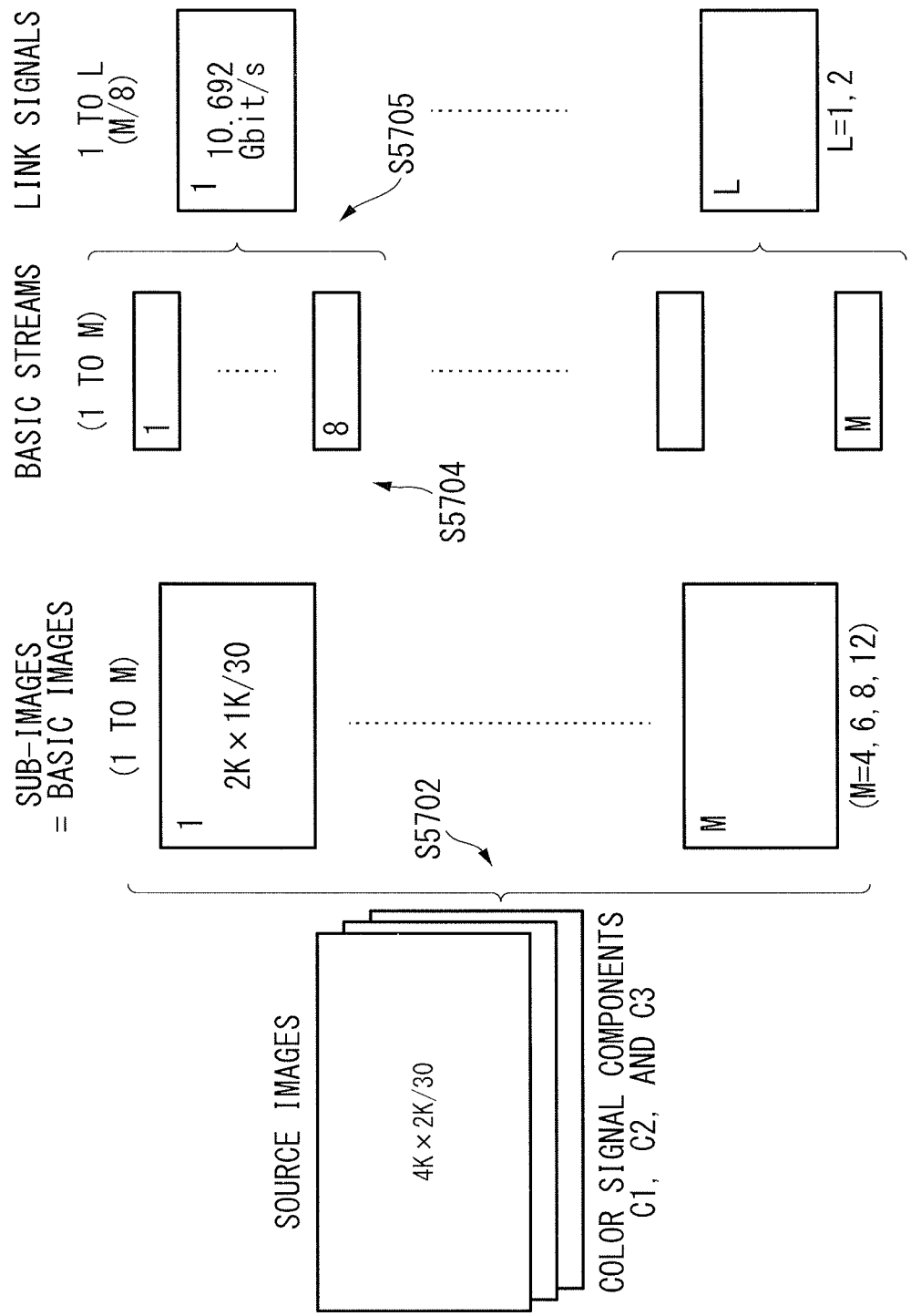

VIDEO SIGNAL TRANSMITTING DEVICE, VIDEO SIGNAL RECEIVING DEVICE, AND RECORDING MEDIUM

TECHNICAL FIELD

The present invention relates to a video signal transmitting device, a video signal receiving device, a video signal transmitting method, a video signal receiving method, a program, and a recording medium for serial transmission of a video signal of a moving image such as in television, and relates in particular to a technique for transmitting a high-definition video signal.

The present application claims priority based on the patent application 2012-194576, filed in Japan on Sep. 4, 2012, and the patent application 2013-091689, filed in Japan on Apr. 24, 2013, and incorporates herein by reference the entire contents thereof.

BACKGROUND ART

Conventionally, SMPTE 292, ITU-R Recommendation BT. 1120, and ARIB standard BTA S-004 have been known as standards for an HDTV signal serial digital interface (HD-SDI).

The HD-SDI standard implementing a 1.5-Gbit/s speed has as a prerequisite an HDTV signal with effective number of pixels of 1920 (number of horizontal pixels)×1080 (number of vertical lines), with 60 fields (30 frames) per second, a 4:2:2 format (the number of pixel ratio between the luminance signal Y and the color difference signals $C_B$ and $C_R$ being 4:2:2, with the color difference signals $C_B$ and $C_R$ sub-sampled 2:1 in the horizontal direction with respect to the luminance signal Y), and 10 bits/pixel. Subsequently, standard SMPTE 372 has been created, which, by using two HD-SDIs, enables transmission of a progressively scanned signal of 60 frames per second, a signal having a 4:4:4 format or a 12 bit/pixel. Additionally, in order to achieve the same transmission capacity as when using two HD-SDI signals of 1.5 Gbit/s, the HD-SDI standard SMPTE 424 has been created, capable of transmitting at a speed of 3 Gbit/s with one signal.

Also, in addition to SMPTE 435-1, 435-2, and 435-3 as standards for transmitting video signals with one to eight HD-SDIs, within one 10-Gbit/s interface, SMPTE 2036-3 is known as a serial digital interface standard for a UHDTV (ultra high-definition television) signal that has double or quadruple the number of pixels of an HDTV signal in each of the horizontal and vertical directions. This standard sets forth a method of performing pixel mapping to divide a UHDTV signal into a plurality of sub-images corresponding to HDTV signals, these being represented by HD-SDI signals on a plurality of channels and transmitted by a plurality of 10-Gbit/s interfaces.

As a specific method, a technique has been disclosed whereby pixels of a frame in a UHDTV signal are sub-sampled every two pixels and mapped onto four sub-images, the mapped pixels being mapped to HD-SDI signals on eight channels, scrambled, and subjected to 8B/10B encoding processing or the like, a plurality of 10-Gbit/s interfaces being used for transmission (for example, refer to Patent Reference 1). This enables a UHDTV video signal with a number of pixels exceeding the number of pixels of an HD-SDI signal to be transmitted by existing 10-Gbit/s interfaces.

PRIOR ART REFERENCES

Patent References

[Patent Reference 1] U.S. Pat. No. 4,645,638 Publication

SUMMARY OF THE INVENTION

Problem to be Solved by the Invention

The above-described standards for a UHDTV signal serial digital interface have as a prerequisite an HD-SDI standard whereby a 10-bit/pixel signal having a 4:2:2 format is transmitted. For this reason, when transmitting a 4:4:4 format signal or a 12-bit/pixel signal as in the method of the Patent Reference 1, it is necessary to reconstruct one pixel into a plurality of data words. That is, transmission of a video signal requires processing to perform mapping between the color signal components in accordance with the video signal format, this being specifically processing to multiplex between a plurality of color signal components constituting the video signal, and processing to rearrange the pixels of the color signal components at the bit level.

Also, in the above-described standards, because the HD-SDI signal only accommodates a video signal having a frame frequency up to 60 Hz, it cannot handle a video signal with a high frame frequency such as 120 Hz.

Also, although the SMPTE 2036-3 standard handles video signals with the 4:4:4, 4:2:2, and 4:2:0 formats, it requires the same transmission capacity as the 4:4:4 format for even a video signal having the 4:2:0 or 4:2:2 format, which has a small total number of pixels.

In the SMPTE 2036-3 standard, the restricted transmission capacity means that, because it utilizes both scrambling and 8B/10B encoding and performs processing of only one thereof, it cannot necessarily completely handle pathological conditions.

Given the above, the present invention has been made to solve the above-described problems, and has as an object to provide a video signal transmission device, a video signal receiving device, a video signal transmission method, a video signal receiving method, a program, and a recording medium, reducing the transmission capacity for a video signal having a format (for example, 4:2:2 or 4:2:0) that has a small total number of pixels without the need to reconstruct one pixel into a plurality of data words, and being capable of handling pathological conditions, without the need to reconstruct one pixel into a plurality of data words.

Means to Solve the Problem (1) A first aspect of the present invention is a video signal transmitting device that, from a video signal of a moving image constituted by a prescribed number of color signal components, generates a link signal having a prescribed speed and transmits a prescribed number of link signals, the video signal transmitting device including: a basic image generation unit configured to generate a color signal basic image corresponding to each of a prescribed number of color signal components constituting the video signal; a basic stream generation unit configured to generate a basic stream; and a link signal generation unit configured to generate a link signal, wherein the basic image generation unit is configured to generate, for each of the color signal component, pixels constituting a frame of the color signal component at a uniform interval two-dimensionally and two-dimensionally arrange the extracted pixels in a prescribed arrangement to generate a prescribed number of color signal basic images, the basic stream generation unit is configured to extract, for each of the color signal basic images, pixels of the color signal basic image generated by the basic image generation unit in a prescribed sequence to generate a basic stream, and the link signal generation unit is configured to synthesize a prescribed number of basic streams in the same or different color signal components generated by the basic stream generation unit, encode bit-length units of the synthesized basic streams to a different bit length, and generate a link signal having a prescribed speed, the synthesis being successively performed for each word, form a leading part to a trailing part of the basic stream.

(2) In the first aspect of the present invention, with respect to a frame of the color signal component, the basic image generation unit, in addition to mapping neighboring pixels on even-numbered lines alternately onto a first color signal sub-image and a second color signal sub-image, may be configured to map neighboring pixels on odd-numbered lines alternately onto a third color signal sub-image and a fourth color signal sub-image, and perform a processing with respect to each of the mapped color signal sub-images, to map, in addition to the mapping of neighboring pixels on even-numbered lines alternately onto a first color signal basic image and a second color signal basic image, neighboring pixels on odd-numbered lines alternately onto a third color signal basic image and a fourth color signal basic image.

(3) In the first aspect of the present invention, the basic image generation unit may generate color signal sub-images, the number of which is in accordance with a format of a video signal of a moving image constituted by a prescribed number of color signal components.

(4) In the first aspect of the present invention, one of 24 Hz, 25 Hz, 30 Hz, 50 Hz, 60 Hz, 120 Hz, 24×(1000/1001) Hz, 30×(1000/1001) Hz, 60×(1000/1001) Hz, and 120×(1000/1001) Hz may be used as the frame frequency of the video signal of a moving image.

(5) In the first aspect of the present invention, the link signal generation unit may be configured to: synthesize basic streams, the number of which is in accordance with the frame frequency; encode first data to second data, the first data having eight bits per word of the synthesized basic streams, the second data having ten bits per word, the encoding being performed by performing 8B/10B encoding processing; and generate the link signal having the prescribed speed.

(6) In the first aspect of the present invention, the link signal generation unit may be configured to: successively extract line data of pixels from basic images; add control data to the extracted line data of the pixels; and generate a basic stream of a prescribed word length per one line with a prescribed number of bits per word.

(7) In the first aspect of the present invention, the link signal generation unit may be configured to: subject a plurality of basic streams generated by the basic stream generation unit to multiplexing processing; subject the multiplexing-processed stream to arrangement processing by byte conversion and 8B/10B encoding processing; and generate link signals having the prescribed speed.

(8) A second aspect of the present invention is a video signal receiving device that receives a prescribed number of link signals from the video signal transmitting device according to the first aspect and reproduces a video signal of a moving image constituted by a prescribed number of color signal components, the video signal receiving device including: a basic image reproduction unit configured to reproduce a color signal basic image in accordance with each of a prescribed number of color signal component constituting the video signal; a source image reproduction unit configured to reproduce a source image; and a basic stream reproduction unit configured to reproduce a basic stream, wherein the basic stream reproduction unit is configured to decode bit-length units of the link signal into a prescribed bit length and, from one of the link signals, reproduce a prescribed number of basic streams in the same or different color signal components, the basic image reproduction unit, for each of the basic streams, is configured to extract data of the video signal from basic streams reproduced by the basic stream reproduction unit and arrange the data of the video signal as pixels in a prescribed sequence to reproduce a color signal basic image, and the source image reproduction unit is configured to multiplex in a prescribed sequence pixels of a prescribed number of color signal basic images in the same color signal component reproduced by the basic image reproduction unit and reproduce a source image of the color signal component, the video signal receiving device is configured to output as a video signal source images of a prescribed number of reproduced color signal components.

(9) A third aspect of the present invention is a non-transitory computer-readable recording medium in which a program for causing a computer of a video signal transmitting device is recorded, the program making the computer generate, from a video signal of a moving image constituted by a prescribed number of color signal components, a link signal having a prescribed speed and transmit a prescribed number of link signals to function as: a basic image generation unit that generates a color signal basic image corresponding to each of a prescribed number of color signal components constituting the video signal; a basic stream generation unit that generates a basic stream; and a link signal generation unit that generates a link signal, so that the basic image generation unit extracts, for each of the color signal components, pixels constituting a frame of the color signal component at a uniform interval two-dimensionally and two-dimensionally arranges the extracted pixels in a prescribed arrangement to generate a prescribed number of color signal basic images, the basic stream generation unit, for each of the color signal basic images, extracts in a prescribed sequence pixels of the color signal basic image generated by the basic image generation unit in a prescribed sequence to generate a basic stream, and the link signal generation unit synthesizes a prescribed number of basic streams in the same or different color signal components generated by the basic stream generation unit, encodes bit-length units of the synthesized basic streams to a different bit length, and generates a link signal having a prescribed speed, the synthesis being successively performed for each word, from a leading part to a trailing part of the basic stream.

(10) A fourth aspect of the present invention is a non-transitory computer-readable recording medium in which a program for causing computer of video signal receiving device is recorded, the program making the computer receive a prescribed number of link signals from the video signal transmitting device according to the first aspect and reproduce a video signal of a moving image constituted by a prescribed number of color signal components to function as: a basic image reproduction unit that reproduces a color signal basic image in accordance with each of a prescribed number of color signal component constituting the video signal; a source image reproduction unit that reproduces a source image; and a basic stream reproduction unit that reproduces a basic stream, so that the basic stream reproduction unit decodes bit-length units of the link signal into a prescribed bit length and, from one of the link signals, reproduces a prescribed number of basic streams in the same or different color signal components, the basic image reproduction unit, for each of the basic streams, extracts data of the video signal from basic streams reproduced by the basic stream reproduction unit and arranges the data of the video signal as pixels in a prescribed sequence to reproduce a color signal basic image, and the source image reproduction unit multiplexes in a prescribed sequence pixels of a prescribed number of color signal basic images in the same color signal component reproduced by the basic image reproduction unit and reproduces a source image of the color signal component, and outputs as a video signal the source images of a prescribed number of reproduced color signal components.

Effect of the Invention

As noted above, according to a number of aspects of the present invention, the transmission capacity for a video signal with a format having a small total number of pixels (for example, 4:2:2 or 4:2:0) is reduced, and pathological conditions can be handled, without the need to reconstruct one pixel into a plurality of data words.

BRIEF DESCRIPTION OF THE DRAWINGS

FIG. 18 is a drawing describing the processing by a link signal generation unit.

FIG. 40 is a drawing describing the processing by the basic stream generation unit according to a second variation example of the fourth embodiment.

FIG. 41 is a drawing describing the processing by the link signal generation unit according to a second variation example of the fourth embodiment.

FIG. 42 is a drawing describing the mapping procedure of the case of a video signal having a source image of 4×2 k pixels and operating at a frame frequency of 30 Hz in a sixth embodiment.

EMBODIMENT(S) FOR CARRYING OUT THE INVENTION

Embodiments of the present invention will be described in detail below using the drawings.

(Transmission System)

Figure 1:
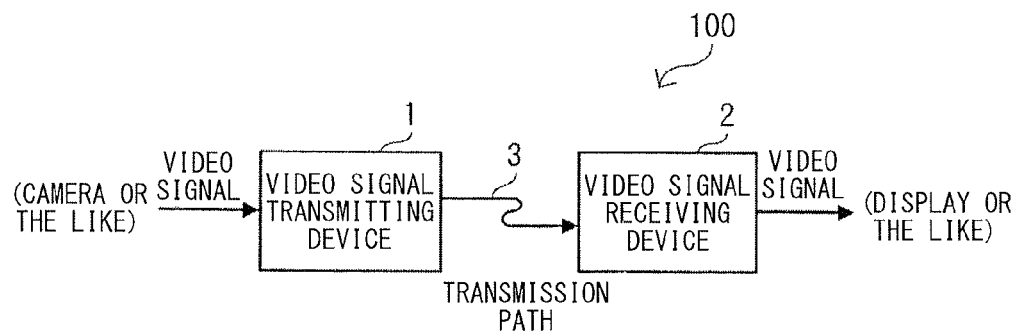
FIG. 1 is a block diagram showing the general constitution of a transmission system including a video signal transmitting device and a video signal receiving device according to a first embodiment of the present invention.

First, a transmission system 100 including a video signal transmitting device and a video signal receiving device according to the first embodiment of the present invention will be described. FIG. 1 is a block diagram showing the general constitution of the transmission system 100. The transmission system 100 has a video signal transmitting device 1 and a video signal receiving device 2. The video signal transmitting device 1, for example, inputs a video signal from a camera or the like and generates a link signal, and the video signal receiving device 2 inputs the link signal to reproduce the video signal and outputs it to a display or the like. The video signal transmitting device 1 and the video signal receiving device 2 are connected by a transmission path 3.

The video signal transmitting device 1 inputs a video signal of a moving image having one or more color signal components and, for each of the one or more color signal components constituting the video signal, generates a prescribed number of sub-images (color signal sub-images), basic images (color signal basic images), and basic streams. The video signal transmitting device 1 generates link signals of a prescribed speed from the basic streams, and transmits the video signal to the video signal receiving device 2 as a prescribed number of link signals of a prescribed transmission speed. In this case, the color signal components are various signal components, such as the three primary colors RGB (red, green, blue), the luminance and color difference signals $YC_BC_R$, or the alfa channel signal A.

The video signal receiving device 2 receives the video signal from the video signal transmitting device 1 as a prescribed number of link signals of a prescribed transmission speed. The video signal receiving device 2 performs processing that is the reverse of the processing by the video signal transmitting device 1, and with regard to the plurality of color signal components constituting the video signal, reproduces the prescribed number of basic streams, basic images, sub-images, and the source images for each of the color signal components, so as to reproduce the video signal.

(Video Signal Transmitting Device)

Figure 2:
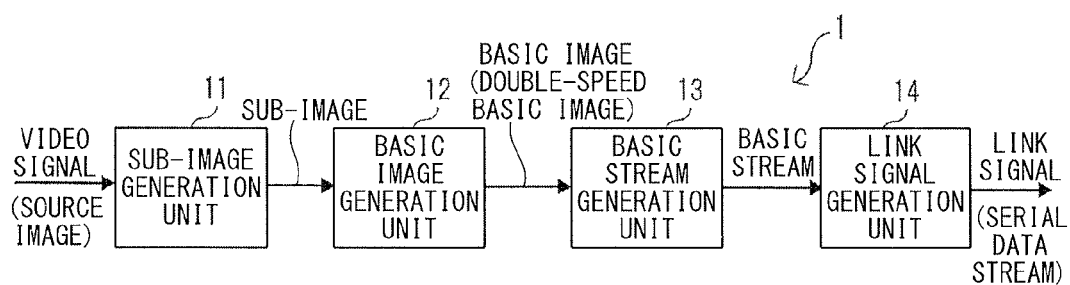
FIG. 2 is a block diagram showing the constitution of a video signal transmitting device.
Figure 3:
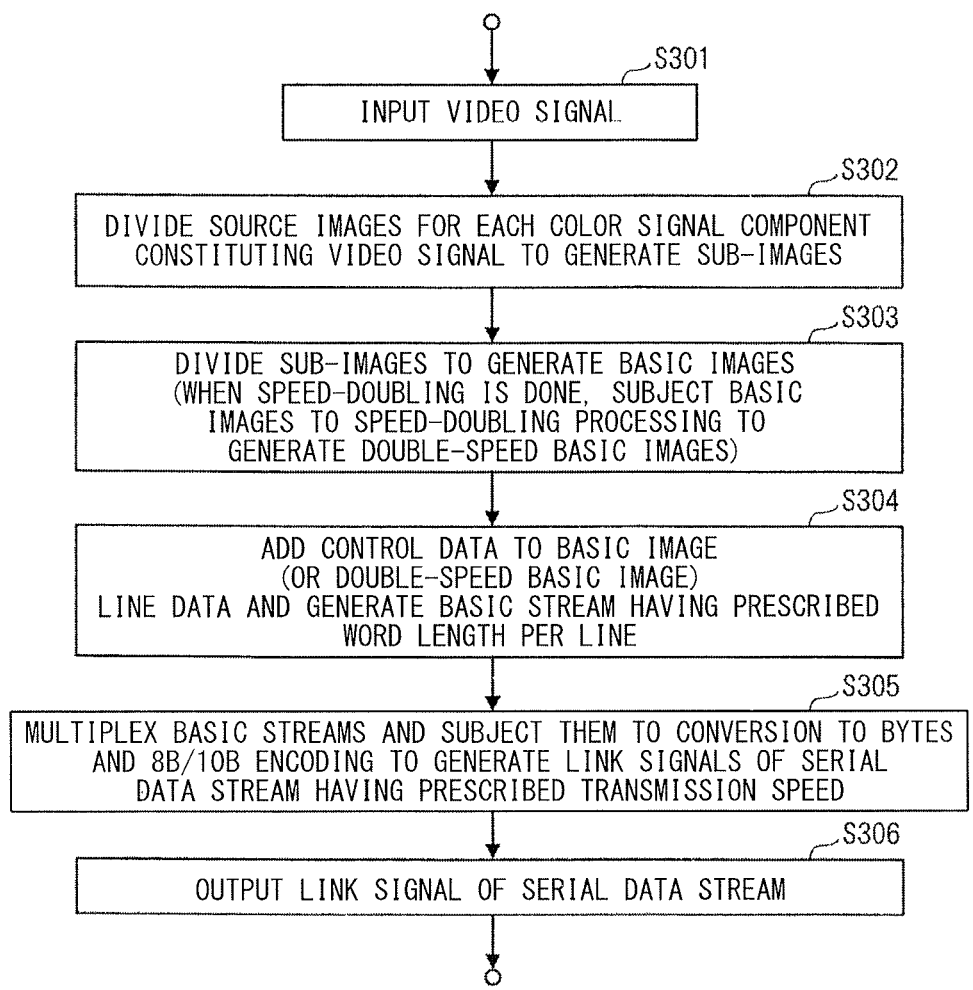
FIG. 3 is a flowchart showing the processing in a video signal transmitting device.

Next, the video signal transmitting device 1 shown in FIG. 1 will be described in detail. FIG. 2 is a block diagram showing the constitution of the video signal transmitting device 1, and FIG. 3 is a flowchart showing the processing by the video signal transmitting device 1. The video signal transmitting device 1 has a sub-image generation unit 11, a basic image generation unit 12, a basic stream generation unit 13, and a link signal generation unit 14.

When the video signal transmitting device 1 inputs a video signal of a moving image constituted by one or more color signal components (step S301), the sub-image generation unit 11, for each color signal component constituting the video signal, divides one frame of the source image to generate a plurality of sub-images, and outputs the plurality of sub-images generated for each color signal component to the basic image generation unit 12 (step S302). Specifically, the sub-image generation unit 11 extracts pixels constituting the source image of the color signal components at uniform intervals in two dimensions and generates a plurality of sub-images arranged two-dimensionally so that the extracted pixels are in a prescribed arrangement. The generated plurality of sub-images correspond to the color signal components, and subsequently processing is performed on each of the sub-images of each color signal component.

For example, if the video signal has a 4:4:4 format and is constituted by the three RGB color signal components, the sub-image generation unit 11 extracts pixels constituting the source image of the R color signal component two-dimensionally four pixels at a time to generate four sub-images. In the same manner, the sub-image generation unit 11 extracts pixels constituting the source images of the G and B color signal components two-dimensionally four pixels at a time to generate four respective sub-images. This generates 12 sub-images from three source images. The details of this will be described later.

The basic image generation unit 12 inputs a plurality of sub-images for each color signal component generated by the sub-image generation unit 11, divides the sub-images to generate a plurality of basic images, and outputs the generated plurality of basic images to the basic stream generation unit 13 (step S303). Specifically, the basic image generation unit 12 extracts pixels constituting the sub-images from prescribed positions to generate a plurality of basic images arranged two-dimensionally so that the extracted pixels are in a prescribed arrangement. If speed-doubling processing of the frame frequency is to be done, the basic image generation unit 12 subjects the generated plurality of basic images to speed-doubling processing to generate a plurality of double-speed basic images, and outputs the generated plurality of double-speed basic images to the basic stream generation unit 13.

The basic stream generation unit 13 successively extracts line data of pixels from the basic images (or double-speed basic images) generated by the basic image generation unit 12, adds control data to the extracted pixel line data, and generates a basic stream of a prescribed word length per one line with a prescribed number of bits per word (step S304).

The link signal generation unit 14 subjects basic streams generated by the basic stream generation unit 13 (two different basic streams generated from two different basic images) to multiplexing processing (synthesis processing), subjects these to arrangement processing by byte conversion, 8B/10B encoding processing, and generates link signals having a prescribed transmission speed (step S305). Then, the video signal transmitting device 1 outputs the prescribed number of link signals of the prescribed transmission speed generated by the link signal generation unit 14 (step S306). In this manner, the video signal transmitting device 1 transmits a video signal of a moving image constituted by a plurality of color signal component as a prescribed number of link signals of a prescribed transmission speed.

(Procedure to Map from a Source Image to Link Signals)

Next, the mapping procedure for the video signal transmitting device 1 shown in FIG. 2 to generate sub-images from a source image of a video signal and to generate each of the basic images (or double-speed basic images), basic streams, and link signals will be described. The mapping procedure described below is the procedure, in the case of a video signal source image operating at a 120-Hz or 60-Hz frame frequency, for generating basic images operating at a frame frequency of 120 Hz and generate 10.692-Gbit/s link signals.

Figure 4:
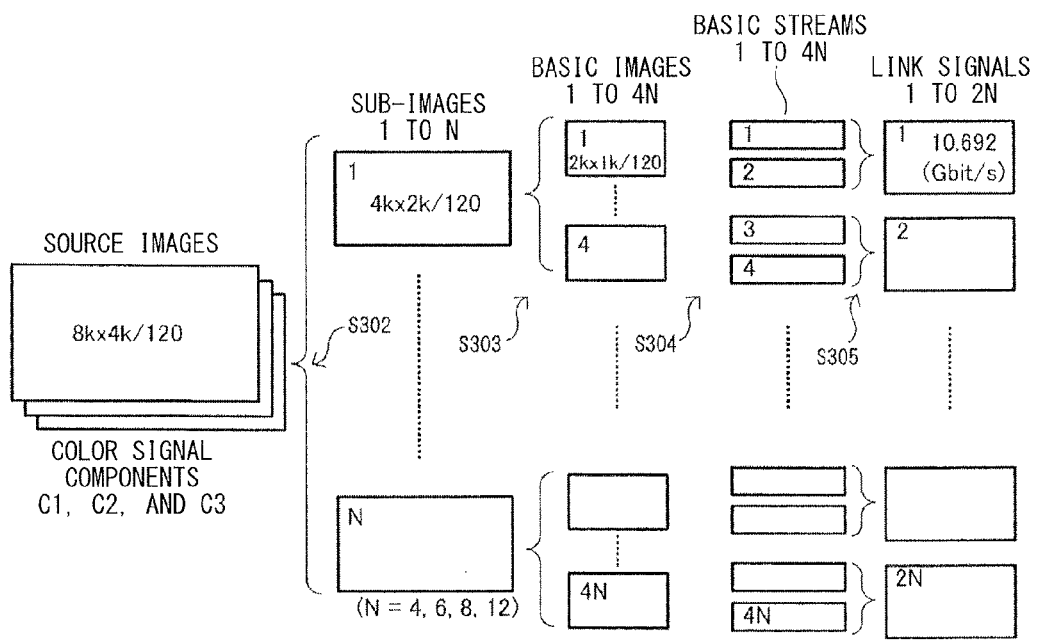
FIG. 4 is a drawing describing the mapping procedure for the case of a video signal having a source image of 8×4 k pixels and operating at a frame frequency of 120 Hz.

FIG. 4 describes the mapping procedure in the case of a video signal source image having 8 k (number of horizontal pixels)×4 k (number of vertical lines) pixels and operating at a frame frequency of 120 Hz. It is assumed here that, in the color signal components C1, C2, and C3 constituting the video signal, the source image of one frame has 8×4 k pixels and operates at a frame frequency of 120 Hz (120 frames per second). The color signal components (C1, C2, C3) are any one of (G, B, R), (Y, $C_B$, $C_R$), and ($\alpha$, -, -). The N shown in FIG. 4 will be described in detail in FIG. 9, as will FIG. 5.

As shown in FIG. 4, the processing of step S302 in the sub-image generation unit 11 generates from the source image N sub-images having 4×2 k pixels and operating at a frame frequency of 120 Hz. The processing of step S303 by the basic image generation unit 12 generates four basic images from the sub-images, the basic images having 2×1 k pixels and operating at a frame frequency of 120 Hz. That is, a total of 4N basic images are generated from N sub-images.

The processing of step S304 by the basic stream generation unit 13 generates basic streams from the basic images. That is, 4N corresponding basic streams are generated from the 4N basic images. The processing of step S305 by the link signal generation unit 14 generates one link signal from the two basic streams, these being transmitted at a speed of 10.692 Gbit/s. That is, 2N link signals are generated from 4N basic streams.

Figure 5:
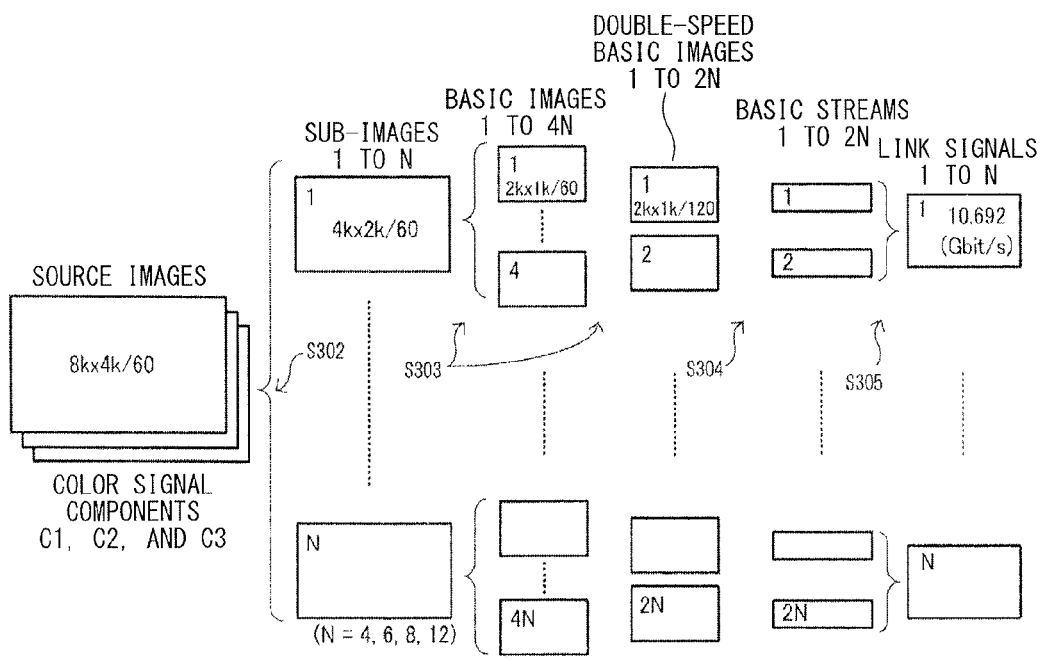
FIG. 5 is a drawing describing the mapping procedure for the case of a video signal having a source image of 8×4 k pixels and operating at a frame frequency of 60 Hz.

FIG. 5 describes the mapping procedure in the case of a video signal source image having 8×4 k pixels and operating at a frame frequency of 60 Hz. It is assumed here that, in the color signal components C1, C2, and C3 constituting the video signal, the source image of one frame has 8×4 k pixels and operates at a frame frequency of 60 Hz (60 frames per second).

As shown in FIG. 5, from the source image, the processing of step S302 by the sub-image generation unit 11 generates N sub-images having 4 k×2 k pixels and operating at a frame frequency of 60 Hz. From the sub-images, the processing of step S303 by the basic image generation unit 12 generates four basic images having 2×1 k pixels and operating at a frame frequency of 60 Hz and, from the two basic images operating at the frame frequency of 60 Hz, one double-speed basic image having 2×1 k pixels and operating at a frame frequency of 120 Hz is generated. In this case, mapping is done so that the two basic images operating at a frame frequency of 60 Hz have two continuous frames of one double-speed basic image operating at a frame frequency of 120 Hz. That is, 2N double-speed basic images operating at a frame frequency of 120 Hz are generated from 4N basic images operating at a frame frequency of 60 Hz. Details will be described later, using FIG. 14A to FIG. 16C.

The processing of step S304 by the basic stream generation unit 13 generates basic streams from the basic images. That is, 2N corresponding basic streams are generated from 2N double-speed basic images. From the two basic streams, the processing of step S305 by the link signal generation unit 14 generates one link signal, which is transmitted at a speed of 10.692 Gbit/s. That is, N link signals are generated from 2N basic streams.

(Sub-Image Generation Unit)

Next, the sub-image generation unit 11 shown in FIG. 2 will be described in detail. As described above, the sub-image generation unit 11, for each color signal component constituting the video signal, divides one frame of the source image to generate a plurality of sub-images. That is, the sub-image generation unit 11 two-dimensionally extracts pixels constituting the source image of a color signal component at uniform intervals and generates a plurality of sub-images arranged two-dimensionally so that the extracted pixels are in a prescribed arrangement. In the following description, the pixels constituting the source image are taken to be 12-bit pixels.

Figure 6:
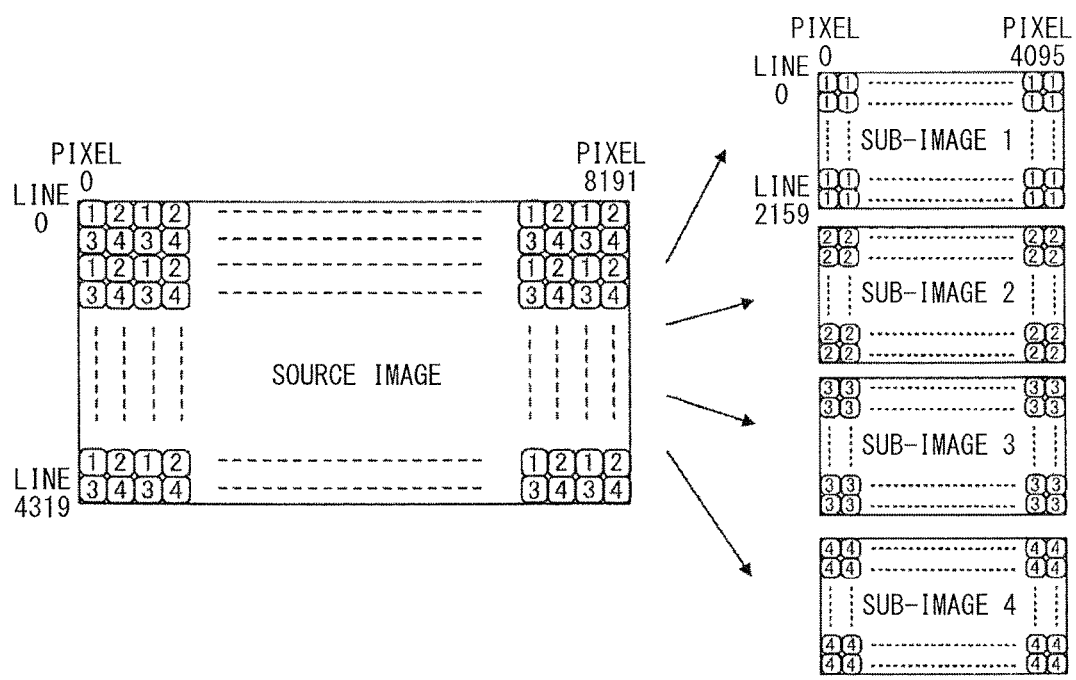
FIG. 6 is a drawing describing the processing of a sub-image generation unit.

FIG. 6 describes the processing by the sub-image generation unit 11 (step S302 shown in FIG. 3). In the source images of each of the color signal components constituting the video signal, within the two-dimensional square regions formed by four pixels, the numeral 1 is applied to the upper-left pixel, the numeral 2 is applied to the upper-right pixel, the numeral 3 is applied to the lower-left pixel, and the number 4 is applied to the lower-right pixel. The sub-image generation unit 11, for each two-dimensional square region constituted by four pixels in the source image of a color signal component, extracts each of the pixels No. 1 to No. 4, and two-dimensionally arranges the pixels of the same numbers in the original arrangement so as to generate four sub-images. Specifically, the sub-image generation unit 11 extracts the pixels with the number 1 in the square regions of the source image and generates the sub-image 1. In the same manner, the sub-image generation unit 11 extracts the pixels with the numbers 2 to 4 in the square regions in the source image to generate the sub-images 2 to 4. That is, the sub-image generation unit 11 maps neighboring samples (samples No. 1 and No. 2) on even-numbered lines (lines 0, 2, . . . ) of the source image alternately onto the sub-image 1 and the sub-image 2, and maps neighboring samples (No. 3 and No. 4) on odd-numbered lines (lines 1, 3, . . . ) of the source image alternately onto the sub-image 3 and the sub-image 4.

Figure 7:
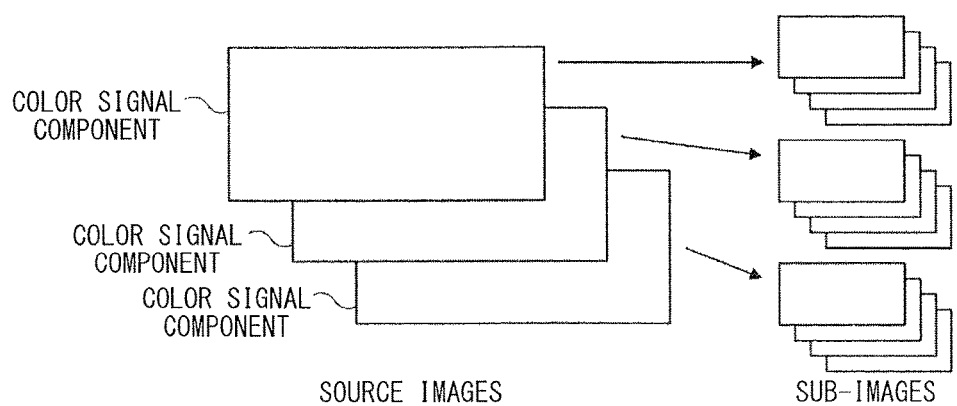
FIG. 7 is a drawing describing the processing of each color signal component by the sub-image generation unit.

FIG. 7 describes the processing of color signal components by the sub-image generation unit 11 (step S302 in FIG. 3). The sub-image generation unit 11 performs the processing shown in FIG. 6 for each of the source images of the three color signal components constituting the video signal and generates four sub-images for a source image of one color signal component, thereby generating a total of 12 sub-images. Although FIG. 6 and FIG. 7 show an example of generating four sub-images from one source image, the number of sub-images generated differs, depending upon the type and signal format of the color signal components.

Figure 8A:
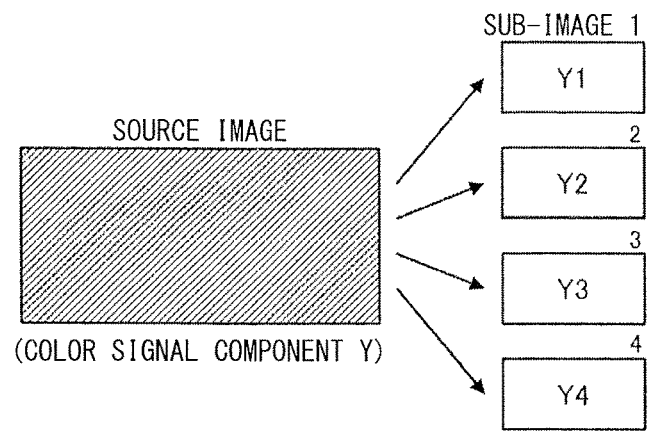
FIG. 8A is a drawing describing the processing of the sub-image processing unit with respect to color signal component Y of a video signal having a 4:2:2 format.
Figure 8B:
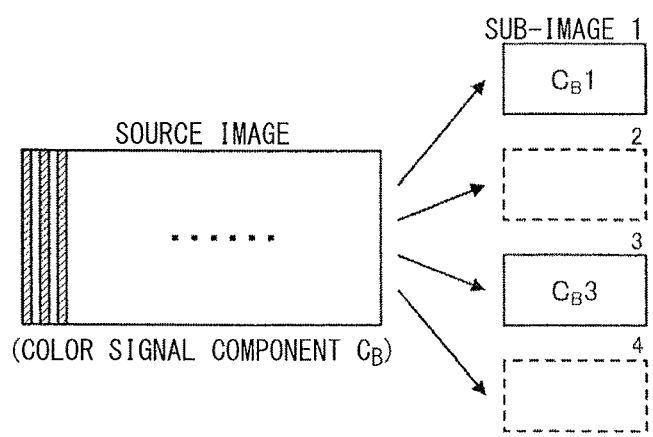
FIG. 8B is a drawing describing the processing of the sub-image processing unit with respect to color signal component Ca of a video signal having a 4:2:2 format.
Figure 8C:
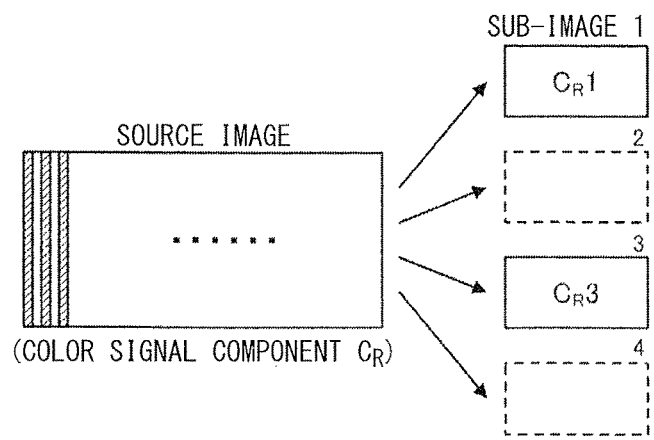
FIG. 8C is a drawing describing the processing of the sub-image processing unit with respect to color signal component $C_R$ of a video signal having a 4:2:2 format.

FIG. 8A to FIG. 8C describe the processing by the sub-image generation unit 11 with respect to a video signal having a 4:2:2 format (step S302 in FIG. 3). The video signal having a 4:2:2 format is a signal in which the ratio of the number of pixels between the luminance information color signal component Y, the B (blue) color difference information color signal component $C_B$, and the R (red) color difference information color signal component $C_R$ is 4:2:2.

The source image in the luminance information color signal component Y has data in all the pixel positions of No. 1 to No. 4 shown in FIG. 6 (refer to the hatched parts of the source image in the luminance information color signal component Y shown in FIG. 8A). Therefore, as shown in FIG. 8A, four sub-images 1 to 4 (Y1 to Y4) are generated from the source image in the luminance information color signal component Y. The source image in the B color difference information color signal component $C_B$ has data in only the pixel positions No. 1 and No. 3 of the pixel positions No. 1 to No. 4 shown in FIG. 6 (refer to the hatched parts of the source image in the B color difference information color signal component $C_B$ shown in FIG. 8B). Therefore, as shown in FIG. 8B, two sub-images 1 and 3 ($C_B1$ and $C_B3$) are generated from the source image in the B color difference information color signal component $C_B$. The source image in the R color difference information color signal component $C_R$ has data in only the pixel positions No. 1 and No. 3 of the pixel positions No. 1 to No. 4 shown in FIG. 6 (refer to the hatched parts of the source image in the R color difference information color signal component Ca shown in FIG. 8C, in the same manner as the source images in the B color difference information color signal component $C_B$). Therefore, two sub-images 1 and 3 ($C_R1$ and $C_R3$) are generated from the source image in the R color difference information color signal component Ca as shown in FIG. 8C.

In this manner, in the case of a 4:2:2 formatted video signal, the sub-image generation unit 11 generates four sub-images from the source image of one frame in the luminance information color signal component Y of the video signal, generates two sub-images from the source image in the B color difference information color signal component $C_B$, and generates two sub-images from the source image in the R color difference information color signal component $C_R$. That is, a total of eight sub-images are generated from the source image of the three types of color signal components Y, $C_B$, and $C_R$ of the 4:2:2 formatted video signal.

Figures 9, 10:
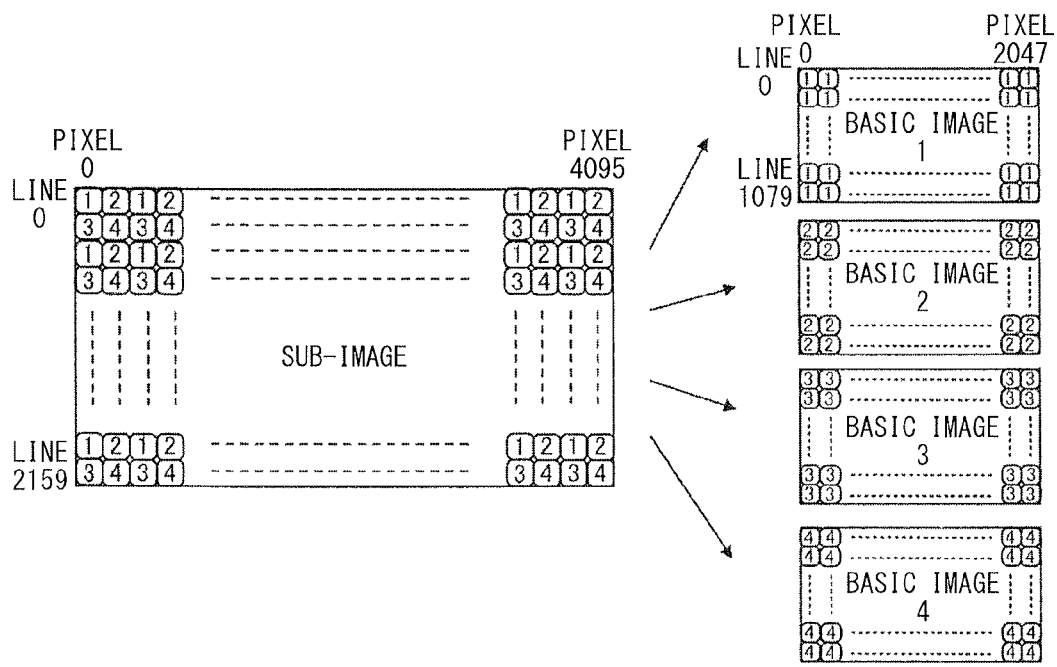
FIG. 9 is a drawing showing the number and constitution of the 4×2 k sub-images with respect to an 8×4 k source image.
FIG. 10 is a drawing describing a first processing by the basic image generation unit.

FIG. 9 shows the number and constitution of the 4×2 k sub-images with respect to an 8×4 k source image, in accordance with the type and the signal format of the color signal components. In FIG. 9, the number of sub-images N is the total number of sub-images generated from the source images of all the color signal components constituting the video signal. The G, B, and R constituting the sub-images indicate the green, blue, and red components, respectively, and the Y, $C_B$, and $C_R$ indicate the luminance, the blue color difference, and the red color difference, respectively. For example, in the case of a 4:4:4 format video signal, four sub-images are generated from the source image of the three types of color signal components R, G, B, making a total of 12 generated sub-images. For a 4:2:0 formatted video signal, four, one, and one sub-image are generated, respectively, from the source image of the three types of color signal components Y, $C_B$, and $C_R$, making a total of six generated sub-images.

(Basic Image Generation Unit)

Next, the basic image generation unit 12 shown in FIG. 2 will be described in detail. As described above, the basic image generation unit 12 divides the sub-images to generate a plurality of basic images. That is, the basic image generation unit 12 extracts pixels constituting sub-images from prescribed positions and generates a plurality of basic images arranged two-dimensionally so that the extracted pixels are in a prescribed arrangement.

FIG. 10 describes the first processing by the basic image generation unit 12 (step S303 shown in FIG. 3). In the sub-image, within the two-dimensional square regions formed by four pixels, the numeral 1 is applied to the upper-left pixel, the numeral 2 is applied to the upper-right pixel, the numeral 3 is applied to the lower-left pixel, and the number 4 is applied to the lower-right pixel. As the first processing, the basic image generation unit 12 extracts each of the pixels No. 1 to No. 4 from each of the two-dimensional square regions of four pixels in the sub-image and arranges the pixels of the same numbers as is two-dimensionally to generate four basic images. Specifically, the basic image generation unit 12 extracts the pixels with the number 1 in each of the square regions of the sub-image and generates the basic image 1. In the same manner, the basic image generation unit 12 extracts each of the No. 2 to No. 4 pixels of each square region in the sub-image to generate, respectively, the basic images 2 to 4. That is, the basic image generation unit 12 maps neighboring samples (samples No. 1 and No. 2) on even-numbered lines (lines 0, 2, . . . ) of the sub-image alternately onto the basic image 1 and the basic image 2, and maps neighboring samples (No. 3 and No. 4) on odd-numbered lines (lines 1, 3, . . . ) of the sub-image alternately onto the basic image 3 and the basic image 4. Because the first processing extracts pixels for each two-dimensional square image made of four pixels, mapping processing is simplified, and it is possible to reduce the delay time of the mapping processing.

Figure 11:
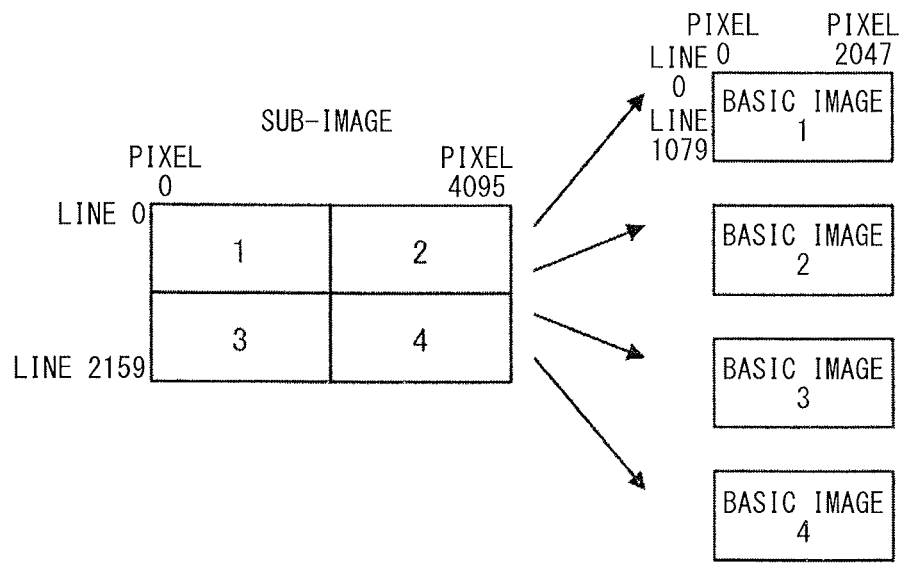
FIG. 11 is a drawing describing a second processing by the basic image generation unit.

FIG. 11 describes the second processing by the basic image generation unit 12 (step S303 shown in FIG. 3). This assumes the case of dividing a sub-image uniformly vertically and horizontally into four two-dimensional regions, with the numeral 1 applied to the group of pixels in the upper-left region, the numeral 2 applied to the group of pixels in the upper-right region, the numeral 3 applied to the group of pixels in the low-left region, and the numeral 4 applied to the group of pixels in the lower-right region. As the second processing, the basic image generation unit 12 divides the sub-image into the regions of the pixel groups No. 1 to No. 4 and extracts each of the regions to generate each of the regions as the four basic images 1 to 4. That is, the basic image generation unit 12 uniformly divides the sub-image in two spatially in lateral and longitudinal directions (the vertical and horizontal directions), and maps these onto the basic images 1 to 4. The second processing is suitable for application when a high-definition video device is constituted by the combination of a plurality of low-definition video devices. That is, it is possible to implement this processing using a plurality of low-definition video devices, without using a high-definition video device.

Figure 12:
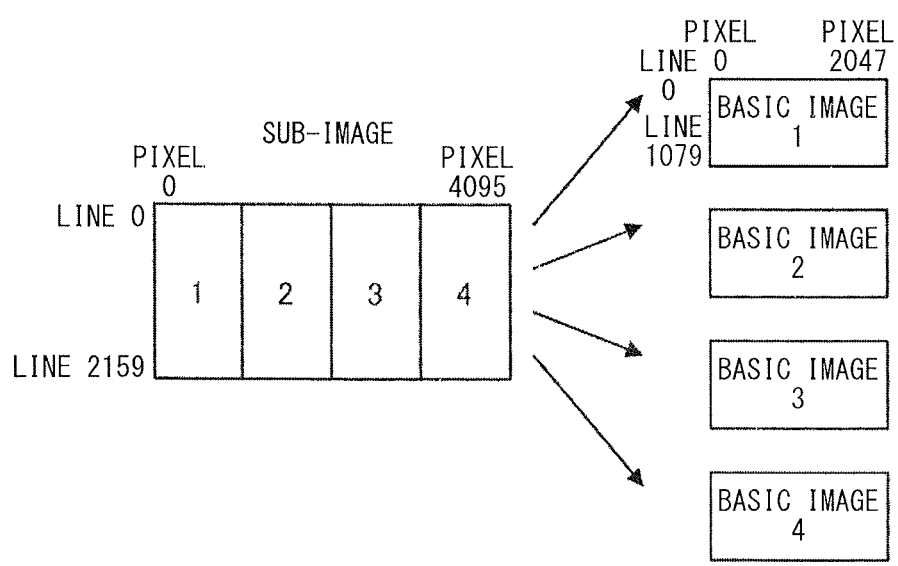
FIG. 12 is a drawing describing a third processing by a basic image generation unit.

FIG. 12 describes the third processing by the basic image generation unit 12 (step S303 shown in FIG. 3). This assumes the case of dividing a sub-image uniformly in the horizontal direction into four two-dimensional regions, the numeral 1 applied to the group of pixels in the left-edge region, the numeral 2 applied to the group of pixels in the center-left region, the numeral 3 applied to the group of pixels in the center-right region, and the numeral 4 applied to the group of pixels in the right-edge region. As the third processing, the basic image generation unit 12 divides the sub-image into the regions of pixel groups No. 1 to No. 4, extracts each of the regions and subjects them to multiplexing processing to generate each of the regions as the four basic images 1 to 4. When this is done, because the number of horizontal pixels in each region of the divided sub-image is ½ the number of horizontal pixels in the basic image and the number of vertical lines in each region of the divided sub-image is two times the number of vertical lines in the basic image, two lines of each region in the divided sub-image are mapped onto one line in the basic image. The third processing is suitable for application when high-definition video signal processing is performed by low-speed parallel processing.

Figure 13A:
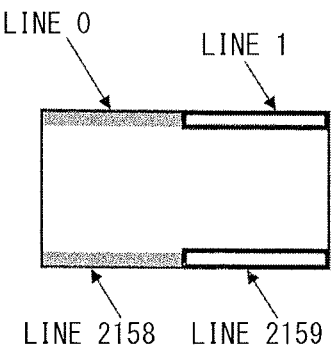
FIG. 13A is a drawing describing the multiplexing processing for each line in the third processing.
Figure 13B:
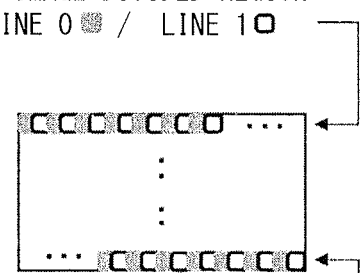
FIG. 13B is a drawing describing the multiplexing processing for each pixel in the third processing.

FIG. 13A describes multiplexing processing for each line in the third processing by the basic image generation unit 12 as shown in FIG. 12. The basic image generation unit 12, for each region of the divided sub-image, maps the first line of the divided region onto the left half of the first line of the basic image and maps the second line of the divided region onto the right half of the first line of the basic image. FIG. 13B describes the multiplexing processing for each pixel in the third processing by the basic image generation unit 12 shown in FIG. 12. The basic image generation unit 12, for each region of the divided sub-image, maps the pixels of the first line and second line of the divided regions alternately onto the first line of the basic image. That is, the basic image generation unit 12 divides the sub-image into four equal parts spatially in the lateral direction (horizontal direction) and maps these onto the basic images 1 to 4.

Figure 14A:
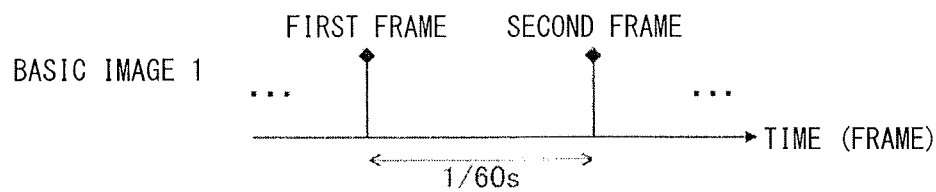
FIG. 14A is a first drawing describing the first speed-doubling processing by the basic image generation unit.
Figure 14B:
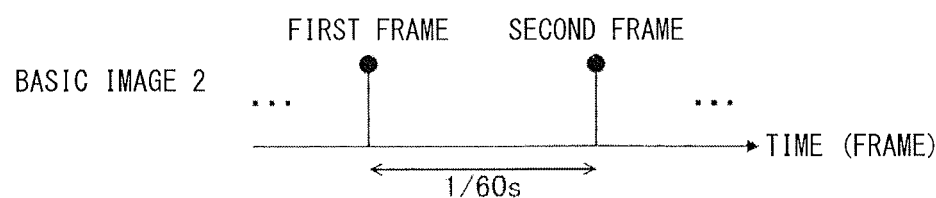
FIG. 14B is a second drawing describing the first speed-doubling processing by the basic image generation unit.
Figure 14C:
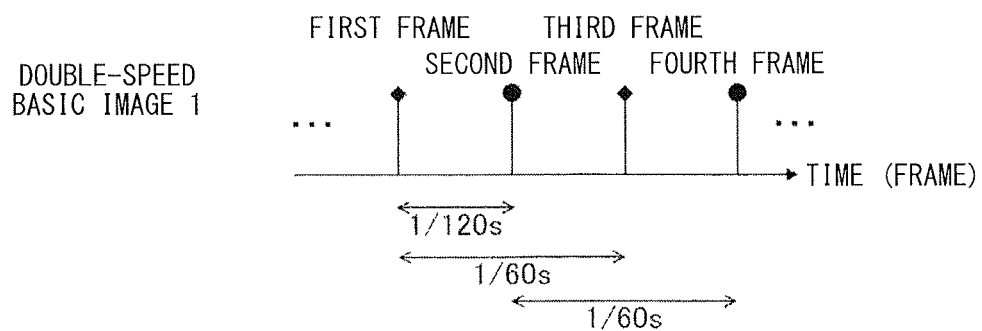
FIG. 14C is a third drawing describing the first speed-doubling processing by the basic image generation unit.

FIG. 14A to FIG. 14C describe the first speed-doubling processing by the basic image generation unit 12 (step S303 shown in FIG. 3). If the frame frequency of the generated basic image is not to be doubled in speed, the basic image generation unit 12 performs only the first processing shown in FIG. 10, the second processing shown in FIG. 11, or the third processing shown in FIG. 12, without performing the speed-doubling processing described below. The speed-doubling processing, for example in the case of a source image frame frequency of 60 Hz, indicates processing to double the basic image having the frame frequency of 60 Hz generated by the basic image generation unit 12 to the frame frequency of 120 Hz. If the frame frequency of the source image is 60 Hz, the basic image generation unit 12 subjects the basic image 1 and the basic image 2 operating at a frame frequency of 60 Hz generated by the first processing shown in FIG. 10, the second processing shown in FIG. 11, or the third processing shown in FIG. 12 to perform multiplexing processing (synthesis processing) for each frame by the speed-doubling processing, so as to generate a double-speed basic image operating at a frame frequency of 120 Hz. That is, frames of the two basic images 1 and 2 are multiplexed, respectively, into two continuous frames of one double-speed basic image 1, so that the first frame of the basic image 1 and the first frame of the basic image 2 are multiplexed to the first frame and the second frame of the double-speed basic image 1 and the second frame of the basic image 1 and the second frame of the basic image 2 are multiplexed to the third frame and the fourth frame of the double-speed basic image 1. In the same manner, frames of the basic image 3 and frames of the basic image 4 are multiplexed into two continuous frames of the double-speed basic image 2.

That is, if the frame frequency of the source image is 60 Hz, the basic image generation unit 12, after generating the basic images 1, 2, 3, and 4 having a frame frequency of 60 Hz by the first processing shown in FIG. 10, the second processing shown in FIG. 11, or the third processing shown in FIG. 12, alternately multiplexes frames of two basic images into frames of double-speed basic image operating at a frame frequency of 120 Hz, so as to treat the video signal input by the video signal transmitting device 1 as a double-speed basic image having a doubled frame frequency. For example, if the frame frequency of a video signal input by the video signal transmitting device 1 is 60 Hz, the basic image generation unit 12 treats it as a double-speed basic image having a frame frequency of 120 Hz.

Figure 15:
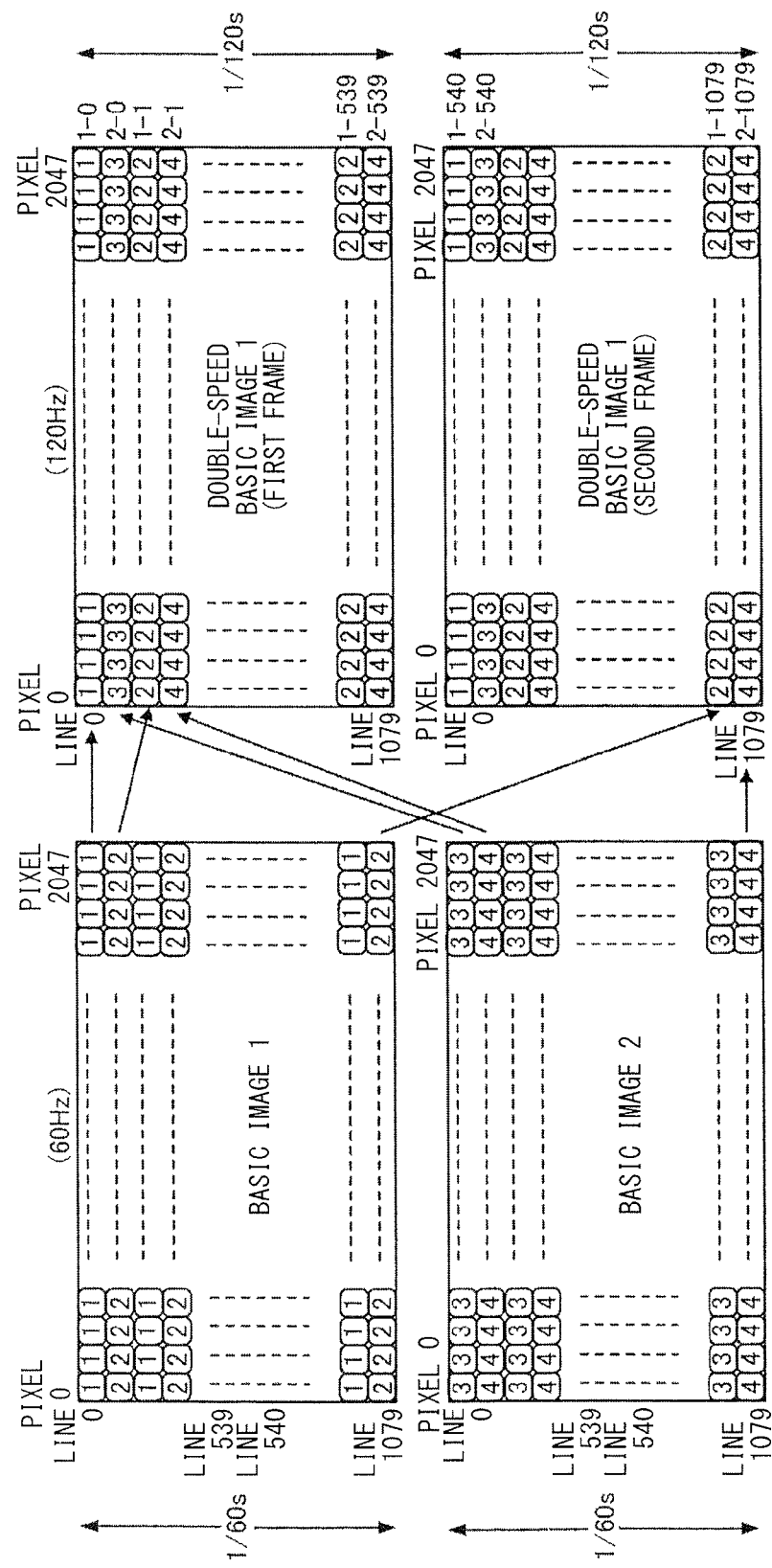
FIG. 15 is a drawing describing the second speed-doubling processing by the basic image generation unit.
Figure 16A:
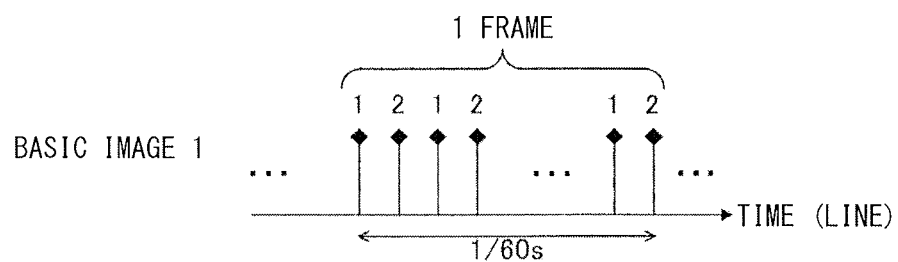
FIG. 16A is a first drawing describing the details of the second speed-doubling processing by the basic image generation unit.
Figure 16B:
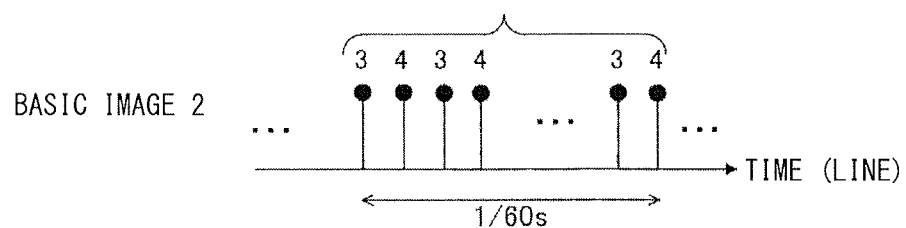
FIG. 16B is a second drawing describing the details of the second speed-doubling processing by the basic image generation unit.
Figure 16C:
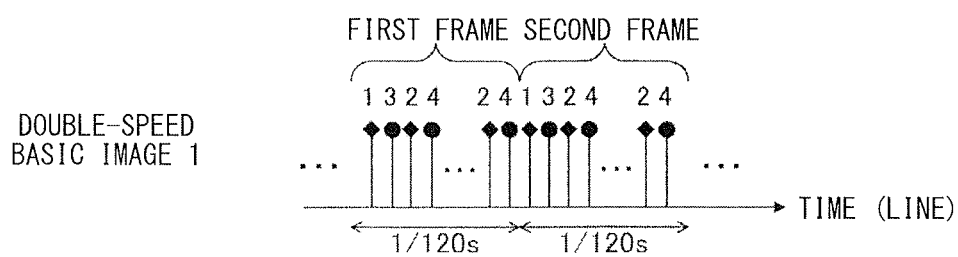
FIG. 16C is a third drawing describing the details of the second speed-doubling processing by the basic image generation unit.

FIG. 15 describes the second speed-doubling processing by the basic image generation unit 12 (step S303 shown in FIG. 3), and FIG. 16A to FIG. 16C describe the details thereof. In the second speed-doubling processing, similar to the first speed-doubling processing shown in FIG. 14A to FIG. 14C, if the frame frequency of the basic image is not to be doubled, the basic image generation unit 12 performs only the first processing shown in FIG. 10, the second processing shown in FIG. 11, or the third processing shown in FIG. 12, without performing the speed-doubling processing described below. If the frame frequency of the source image is 60 Hz, FIG. 15 and FIG. 16A to FIG. 16C show the processing for doubling the speed of a basic image having a frame frequency of 60 Hz generated by the basic image generation unit 12 to a frame frequency of 120 Hz. If the frame frequency of the source image is 60 Hz, the basic image generation unit 12, with respect to two basic images operating with a frame frequency of 60 Hz generated by the first processing shown in FIG. 10, the second processing shown in FIG. 11 or third processing shown in FIG. 12, performs multiplexing by speed-doubling processing (synthesis processing) of each line, thereby generating a doubled-speed basic image operating with a frame frequency of 120 Hz.

In the basic image 1 having a frame frequency of 60 Hz generated by the first processing and the second processing or third processing by the basic image generation unit 12, the numeral 1 is applied to pixels of even-numbered lines (0, 2, ..., 1078) and the numeral 2 is applied to pixels of odd-numbered lines (1, 3, ..., 1079), and in the basic image 2, the numeral 3 is applied to pixels of even-numbered lines, and the numeral 4 is applied to pixels of odd-numbered lines. As the second speed-doubling processing, the basic image generation unit 12 divides the two basic images 1 and 2 having a frame frequency of 60 Hz uniformly in the vertical direction into two regions (into upper-half and lower-half regions), multiplexes (synthesizes) the upper-half regions of the two basic images 1 and 2 by lines to generate the first frame of the double-speed basic image 1, and multiplexes the lower-half regions of the two basic images 1 and 2 by lines to generate the second frame of the double-speed basic image 1. In the same manner, the basic image generation unit 12 divides the two basic images 3 and 4 uniformly in the vertical direction into two regions (into upper-half and lower-half regions), multiplexes the upper-half regions of the two basic images 3 and 4 by lines to generate the first frame of the double-speed basic image 2, and multiplexes the lower-half regions of the two basic images 3 and 4 by lines to generate the second frame of the double-speed basic image 2.

That is, if the frame frequency of the source image is 60 Hz, after generating the basic images having a frame frequency of 60 Hz by the first processing shown in FIG. 10, the second processing shown in FIG. 11, or the third processing shown in FIG. 12, the basic image generation unit 12 alternately extracts lines of two basic images and arranges them in a prescribed arrangement so as to perform mapping onto a double-speed basic image operating at a frame frequency of 120 Hz, and also alternately extracts lines of the other two basic images and arranges them in a prescribed arrangement so as to perform mapping onto a double-speed basic image, thereby treating the double-speed basic image as a signal having a frame frequency that is doubled with respect to that of the video signal input by the video signal transmitting device 1. For example, if the frame frequency of the video signal input by the video signal transmitting device 1 is 60 Hz, the basic image generation unit 12 treats each of the double-speed basic images as signals with a frame frequency of 120 Hz. In this case, because each of the lines 0 to 1079 of the basic images 1 and 2 are scanned simultaneously in 1/60 second, lines 0 to 539 of the basic image 1 and lines 0 to 539 of the basic image 2 are each scanned in 1/120 second, the first frame of the double-speed basic image 1 resulting from multiplexing these by lines being a 1/120-second signal. In the same manner, the second frame of the double-speed basic image 1 resulting from multiplexing by lines the lines 540 to 1079 of the basic image 1 and lines 540 to 1079 of the basic image 2 by lines is a 1/120-second signal following the first fame of the double-speed basic image 1. The same is the case for the basic images 3 and 4.

Although the basic image generation unit 12 generates the double-speed basic image 1 from the basic images 1 and 2 and generates the double-speed basic image 2 from the basic images 3 and 4, the combinations of the original two basic images are not limited to this. For example, the basic image generation unit 12 may generate the double-speed basic image 1 from the basic images 1 and 4 and generate the double-speed basic image 2 from the basic images 2 and 3.

In this manner, if the frame frequency of a video signal input by the video signal transmitting device 1 is 120 Hz, the basic image generation unit 12 can perform the first processing shown in FIG. 10, the second processing shown in FIG. 11, or the third processing shown in FIG. 12 to generate basic images operating at a frame frequency of 120 Hz. If the frame frequency of a video signal input by the video signal transmitting device 1 is 60 Hz, the basic image generation unit 12 can perform the first speed-doubling processing shown in FIG. 14A to FIG. 14C or the second speed-doubling processing shown in FIG. 15 and FIG. 16A to FIG. 16C with respect to basic images generated by performing the first processing shown in FIG. 10, the second processing shown in FIG. 11 or the third processing shown in FIG. 12 and operating at a frame frequency of 60 Hz, so as to generate double-speed basic images operating at a frame frequency of 120 Hz.

(Basic Stream Generation Unit)

Next, the basic stream generation unit 13 shown in FIG. 2 will be described in detail. As described above, the basic stream generation unit 13 extracts line data of pixels from a 2×1 k basic image (or a double-speed basic image) operating at a frame frequency of 120 Hz, adds control data to the line data, and generates basic streams with a prescribed word length for each line, with one word having 12 bits per pixel, which is the same number of pixel bits as in the source image.

Figure 17A:
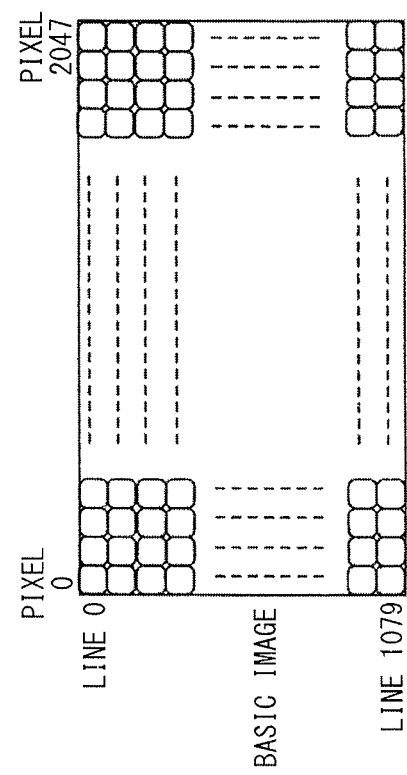
FIG. 17A is a first drawing describing the processing by a basic stream generation unit.
Figure 17B:
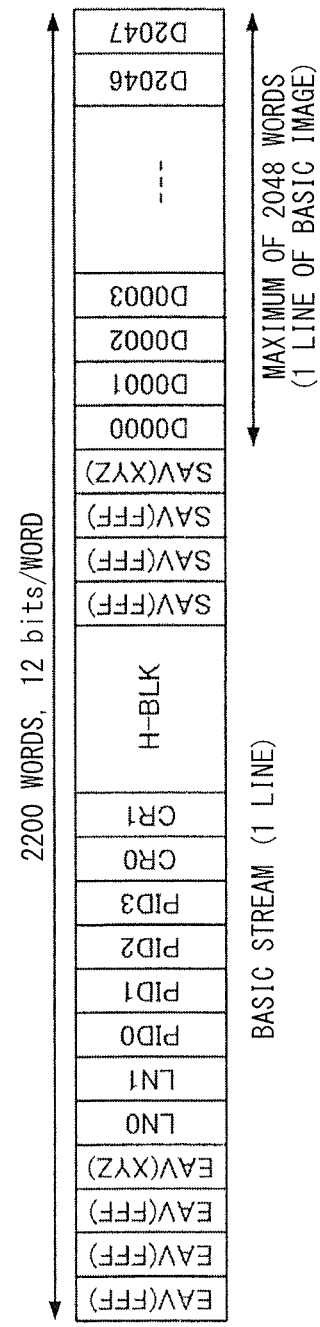
FIG. 17B is a second drawing describing the processing by a basic stream generation unit.

FIG. 17A and FIG. 17B describe the processing by the basic stream generation unit 13 (step S304 shown in FIG. 3). The basic stream generation unit 13 extracts 2 k (2048) pixels for each line in the lateral direction (horizontal direction) with respect to a basic image (or double-speed basic image) having 2×1 k pixels. The basic stream generation unit 13 then adds the control data such as timing reference signals EAV (end of active video), LN (line number), PID (payload ID), CR (cyclic redundancy check code), H-BLK (horizontal blanking), and SAV (start of active video) to the data D0000 to D2047 of the extracted pixels, and constitutes, by line, a basic stream having a total length of 2200 words, with 12 bits per word. In this case, the pixels constituting the source images of the video signal, as described above, have 12 bits. The 2200 words are matched to the HD-SDI word length of the 1080/60 HDTV system.

(Link Signal Generation Unit)

Next, the link signal generation unit 14 shown in FIG. 2 will be described in detail. As described above, the link signal generation unit 14 subjects two different basic streams generated from two different basic images to multiplexing processing (synthesis processing), arrangement processing by byte conversion, and 8B/10B encoding processing to generate a 10.692-Gbit/s link signal. Because 10.692 Gbit/s is equal to the interface speed set forth by SMPTE 435-1, it is possible to utilize existing transmitting and receiving devices.

Figure 19:
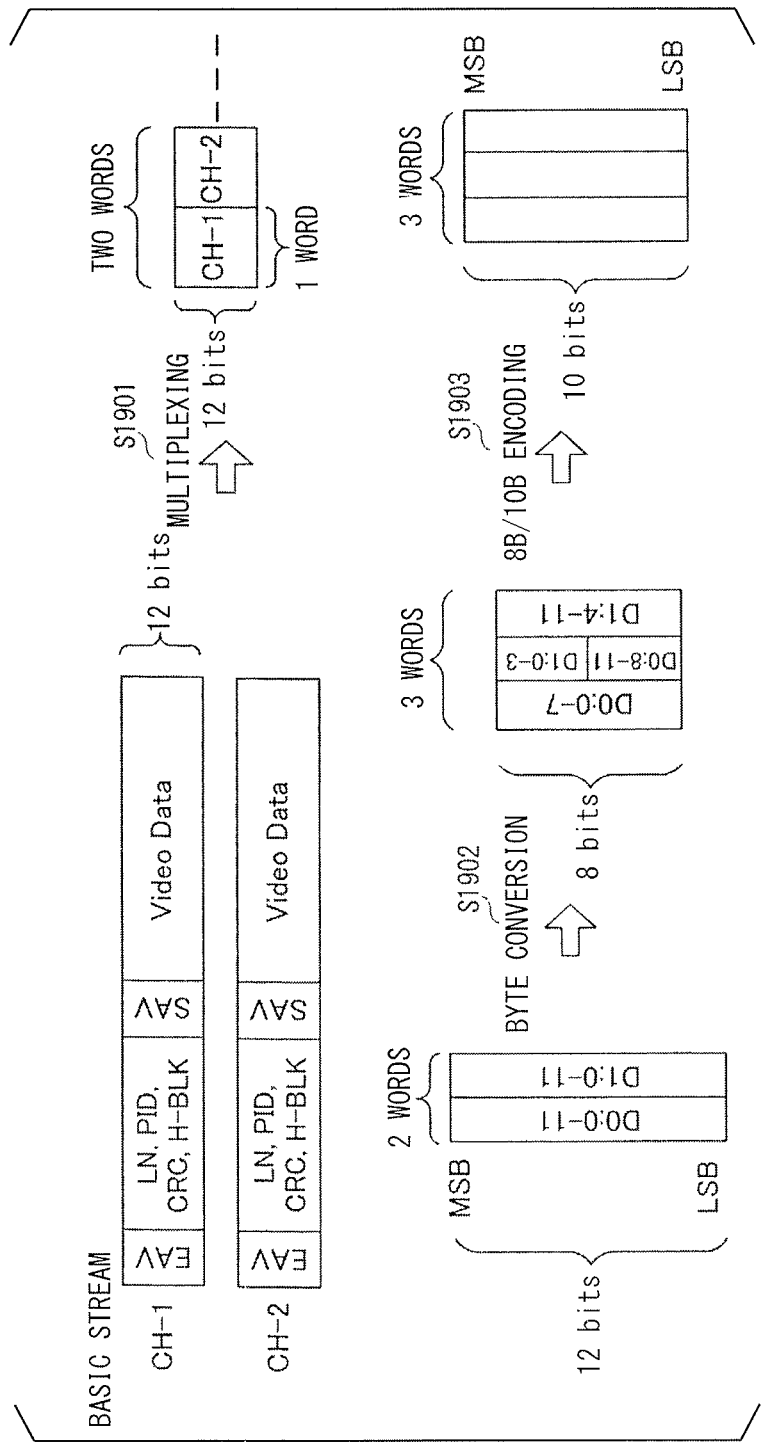
FIG. 19 is a drawing describing the details of the processing by the link signal generation unit.

FIG. 18 describes the processing by the link signal generation unit 14 (step S305 shown in FIG. 3), and FIG. 19 describes the details of the processing by the link signal generation unit 14. The link signal generation unit 14 inputs two basic streams of CH-1 and CH-2 corresponding to two different basic images, respectively. The link signal generation unit 14 subjects one word of data of the basic stream of CH-1 and one word of data of the basic stream of CH-2 to multiplexing processing (step S1901). The multiplexing processing is successively performed for each word, from the leading part to the trailing part of the basic stream.

The link signal generation unit 14 subjects two words of multiplexed data to arrangement processing by byte conversion, and generates a total of three words of data, with eight bits per word (step S1902). Specifically, as shown in FIG. 19, the link signal generation unit 14 generates the lower-order eight bits (D0: 0 to 7) of the data of one word (D0: 0 to 1) of the CH-1 basic stream, for a total of eight bits (D0: 8 to 11, D1: 0 to 3) of the upper-order four bits (D0: 8 to 11) of the data of one word (D0: 0 to 11) of the CH-1 basic stream, and the lower-order four bits (D1: 0 to 3) of the data of one word (D1: 0 to 11) of the CH-2 basic stream, and the upper order eight bits (D1: 4-11) of the data of one word in the CH-2 basic stream, as a total of three words of data with eight bits per word.

The link signal generation unit 14 subjects each data of the total of three words having eight bits per word to 8B/10B encoding processing and generates a data of the total of three words having 10 bits per word (step S1903). The link signal generation unit 14 performs the processing of step S1901 to step S1903 from the leading part to the trailing part of the CH-1 basic stream and the CH-2 basic stream, generating 6600 words of data having 10 bits per word, adds thereto 1320 words of stuffing data and, as shown in FIG. 18, generates a 10.692-Gbit/s link signal having 7920 words per line. The reason that the speed of the link signal is 10.692 Gbit/s is because, with 7920 words×10 bits=79,200 bits per line, the number of lines being 1080+45 (the number of lines for V-BLK (vertical blanking)) 1125 lines, the frame frequency being 120 Hz, and the speed being 79,200×1125× 120=10.692 Gbit/s.

Although the link signal generation unit 14 inputs the two basic streams of CH-1 and CH-2 corresponding to two different basic images, the CH-1 basic stream and the CH-2 basic stream may correspond to two images among the basic images, and the two basic images may be generated from different sub-images that have different color signal components. Which basic streams are combined to generate the link signal may be determined according to manufacturing or operational requirements of the video signal transmitting device 1 having an interface, and the attributes of the basic streams constituting the link signals (such as the color signal components, source image, sub-image, basic image, and method of division) can be identified by using the above-noted PID.

Figures 20, 21:
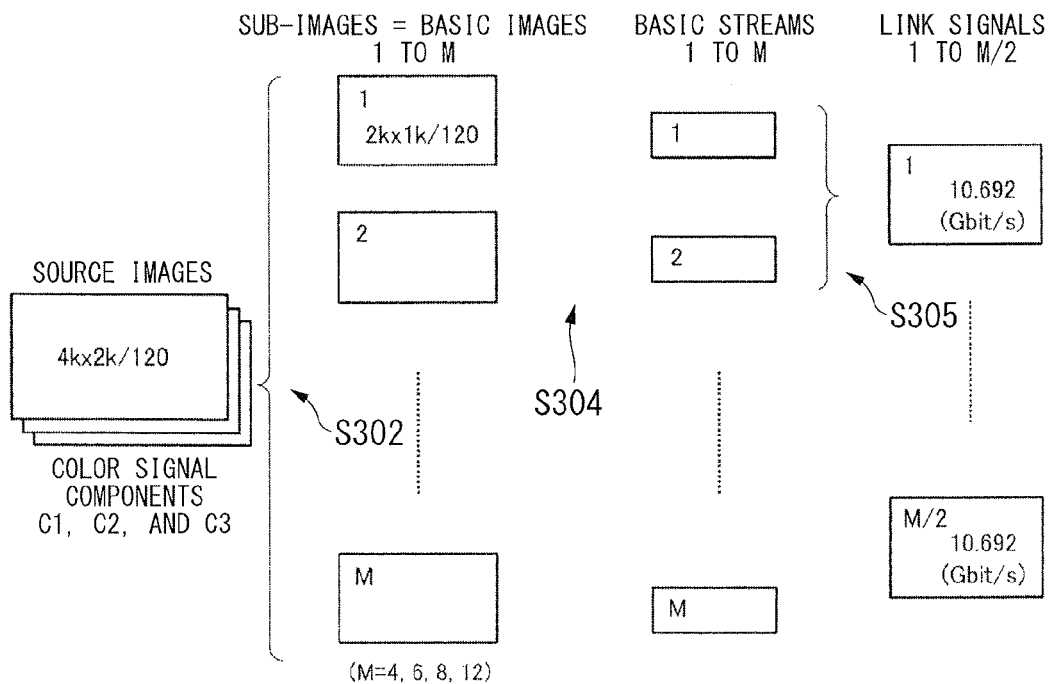
FIG. 20 is a drawing showing the number of link signals for the case of 8×4 k video.
FIG. 21 is a drawing describing the mapping procedure for the case of a video signal having a source image of 4×2 k pixels and operating at a frame frequency of 120 Hz.

FIG. 20 shows the number of the link signals for various formats of input 8 k×4 k video signals. In the column showing the number of 10.692-Gbit/s link signals, 120 Hz and 60 Hz indicate the frame frequency of the video signal input by the video signal transmitting device 1. For example, for a video signal having 4:4:4 formatted color signal components (G, B, R), there are 24 link signals if the frame frequency thereof is 120 Hz and 12 link signals if the frame frequency thereof is 60 Hz. For a video signal having 4:2:0 formatted color signal components (Y, $C_B$, $C_R$), there are 12 signals if the frame frequency thereof is 120 Hz and 6 signals if the frame frequency thereof is 60 Hz. These numbers of link signals, with the number of sub-images being N, as shown in FIG. 4 and FIG. 5, correspond to 2N signals for the case of a video signal frame frequency of 120 Hz and N signals for the case of a video signal frame frequency of 60 Hz.

(The Case of a DG format Video Signal)

Next, as a specific example of the processing by the video signal transmitting device 1 shown in FIG. 2, the case of an 8×4 k input video signal having a DG (dual green) format will be described. A DG format video signal, is constituted by RGB color signal components, with two pixels of a G signal disposed diagonally and one pixel each of the B signal and R signal in a four-pixel region (two vertical pixels×two horizontal pixels). For this reason, referring to the components G1, G4, B3, and R2 of the signal format DG sub-image shown in FIG. 9, the sub-image generation unit 11 generates one sub-image from the source-image of the R color signal component, two sub-images from the source image of the G color signal component, and one sub-image from the source image of the B color signal component. The basic image generation unit 12 generates four basic images for each of one sub-image in the R color signal component, two sub-images in the G color signal component, and one sub-image in the B color signal component. If the frame frequency is 60 Hz, 120-Hz speed-doubled basic images are generated by the above-described speed-doubling processing.

If a pixel is 10 bits, because this is treated as a 12-bit pixel, 10 bits of data of pixels in the video signal are mapped onto the MSB end and zero is mapped into the remaining LSB end. This enables the video signal transmitting device 1 to handle the pixels the same as 12-bit pixels.

(The Case of a 4 k×2 k Video Signal)

Next, the case of an input video signal constituted by 4×2 k pixels will be described. FIG. 21 describes the mapping procedure in the case in which, in one color signal component of one or more color signal components constituting the video signal, the source image of one frame thereof is constituted by 4 k (number of horizontal pixels)×2 k (number of vertical lines) pixels and operates at a frame frequency of 120 Hz (120 frames per second). The M shown in FIG. 21 will be described in detail later using FIG. 23.

In this case, the 4×2 k source images are divided into M 2×1 k sub-images by the sub-image generation unit 11 performing the processing of step S302. Because the 2×1 k sub-images correspond to basic images, this processing corresponds to the first processing (S303) by the basic image generation unit 12 shown in FIG. 10. The number and constitution of the generated basic images depend on the input video and the signal format.

Figures 22, 23:
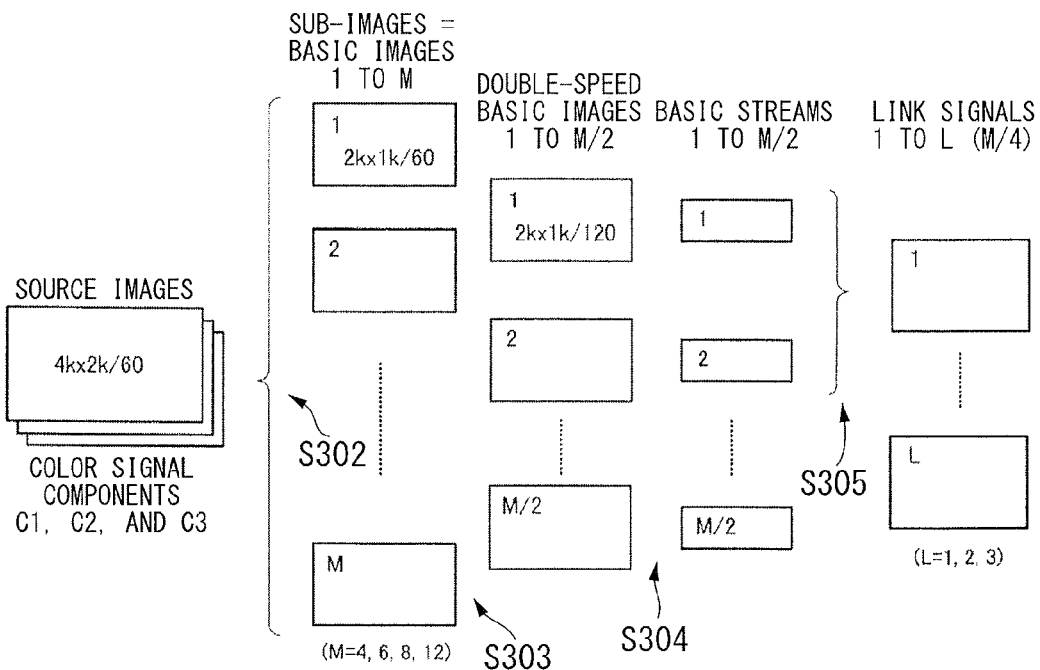
FIG. 22 is a drawing describing the mapping procedure for the case of a video signal having a source image of 4×2 k pixels and operating at a frame frequency of 60 Hz.
FIG. 23 is a drawing showing the number and constitution of 2×1 k basic images with respect to a 4×2 k source image.

FIG. 23 shows the number and constitution of the 2×1 k basic images corresponding to a 4×2 k source image in accordance with the color signal component type and signal format. In FIG. 23, the number of basic images M is the total number of basic images generated from the source images of all of the color signal components constituting the video signal. In the constitution of the source image, g, b, and r are the green, blue, and red components, respectively, y is the luminance, cb is the blue color difference, and cr is the red color difference. For example, in the case of a video signal with 4:4:4 formatted color signal components (G, B, R), four basic images each are generated from the source images of the three types of color signal components R, G, and B, for a total of 12 basic images. In the case of a video signal with 4:2:0 formatted color signal components (Y, $C_B$, $C_R$), four, one, and one basic images are generated from the source images of the three types of color signal components Y, $C_B$, and $C_R$, for a total of six basic images.

The processing of step S304 by the basic stream generation unit 13 generates basic streams from the basic images. That is, M corresponding basic streams are generated from M basic images. Then, the processing of step S305 by the link signal generation unit 14 generates one link signal from two basic streams, the link signal being transmitted at the speed of 10.692 Gbit/s. That is, M/2 link signals are generated from M basic streams.

FIG. 22 describes the mapping procedure in the case of a video signal in which the source image thereof is constituted by 4×2 k pixels and which operates at a frame frequency of 60 Hz. The processing of step S302 by the sub-image generation unit 11 divides the 4×2 k source images into M 2×1 k sub-images. Because the 2×1 k sub-images correspond to basic images, this processing corresponds to the first processing (S303) by the basic image generation unit 12 shown in FIG. 10. The basic image generation unit 12 performs the first or the second speed-doubling processing to treat the basic image having a frame frequency of 60 Hz as having a frame frequency of 120 Hz, thereby generating double-speed basic images.

The processing of step S304 by the basic stream generation unit 13 generates basic streams from double-speed basic images. That is, M/2 double-speed basic images are generated from M basic images, thereby generating M/2 corresponding basic streams. The processing of step S305 by the link signal generation unit 14 generates one link signal from two basic streams, the link signal being transmitted at the speed of 10.692 Gbit/s. That is, L=M/4 link signals are generated from M/2 basic streams. In the case of the 4:2:0 signal format (M=6), however, three basic streams are generated and, similar to the case of the 4:2:2 format (M=8) generating four basic streams, the total number of link signals is two.

Figures 24, 25:
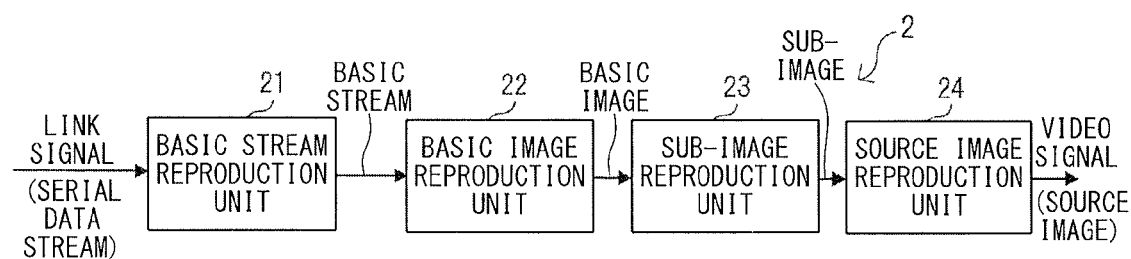
FIG. 24 is a drawing showing the number of link signals for the case of 4×2 k video.
FIG. 25 is a block diagram showing the constitution of a video signal receiving device.

FIG. 24 shows the number of link signals for various 4 k×2 k input video signal formats. In the column showing the number of 10.692-Gbit/s link signals, 120 Hz and 60 Hz indicate the frame frequency of the video signal input by the video signal transmitting device 1. For example, for a video signal having 4:4:4 formatted color signal components (G, B, R), there are six link signals if the frame frequency thereof is 120 Hz and 3 signals if the frame frequency thereof is 60 Hz. For a video signal having 4:2:0 formatted color signal components (Y, $C_B$, $C_R$), there are three link signals if the frame frequency thereof is 120 Hz and two signals if the frame frequency thereof is 60 Hz.

As noted above, the video signal transmitting device1 according to the first embodiment of the present invention, for each of one or more color signal components constituting a video signal, generates a number of sub-images, basic images, and basic streams in accordance with the format of the video signal and transmits a prescribed number of link signals. That is, the sub-image generation unit 11, the basic image generation unit 12, and the basic stream generation unit 13 perform processing of each color signal component. This enables the handling of each of a plurality of color signal components as an independent video stream, thereby enabling flexible handling of various formats of video signals. It is not necessary to perform mapping on the pixel and bit level between color signal components in accordance with the format of the video signal. Specifically, the basic stream generation unit 13 generates a prescribed number of basic images for each color signal component as a basic stream having 12 bits per word. Because it is therefore unnecessary to perform processing to multiplex in units of pixels and bits between color signal components and processing to rearrange pixels of color signal components on the bit level, processing in accordance with the video signal format being unnecessary, it is possible to transmit a video signal in which one pixel is constituted by 12 bits as a plurality of 10.692-Gbit/s link signals using common simple processing without depending on the video signal format.

Also, in the video signal transmitting device 1 according to the first embodiment of the present invention, the basic image generation unit 12 generates basic images operating at a frame frequency of 120 Hz, not only for a video signal frame frequency of 120 Hz, but also for a video signal frame frequency of 60 Hz. For example, the basic image generation unit 12 operates a basic image at a 120-Hz frame frequency with respect to a sub-image operating at a frame frequency of 60 Hz. This, in addition to enabling handling of not only a 60-Hz, but also a high 120-Hz frame frequency video signal, enables the processing by the basic stream generation unit 13 and the link signal generation unit 14 after generation basic images to be used in common for both 60-Hz and 120-Hz frame frequency video signals. Therefore, even if 60-Hz and 120-Hz frame frequency video signal are mixed, it is possible to use an interface having a common transmitting clock.

In the video signal transmitting device 1 according to the first embodiment of the present invention, the sub-image generation unit 11, the basic image generation unit 12, the basic stream generation unit 13, and the link signal generation unit 14 generate sub-images, basic images, basic streams, and link signals, the respective numbers of which are in accordance with the video signal format. In the SMPTE 2036-3 standard, even in the case of a video signal of the 4:2:0 or 4:2:2 format, in which the total number of pixels is small, a 10.692-Gbit/s link signal that is the same as in the 4:4:4 format is generated, thereby requiring the same transmission capacity as for the 4:4:4 format. In contrast, in the first embodiment of the present invention, in the case of a video signal of the 4:2:0 or 4:2:2 format, in which the total number of pixels is small, a smaller number of 10.692-Gbit/s link signals than the 4:4:4 format are generated, enabling a reduction in the transmission capacity and achieving efficiency.

In the video signal transmitting device 1 according to the first embodiment of the present invention, the link signal generation unit 14 subjects the basic streams to multiplexing processing and rearrangement by byte conversion, followed by 8B/10B encoding processing. In the SMPTE 2036-3 standard, because of the restricted transmission capacity although both scrambling processing and 8B/10B encoding processing are used, the processing of only one thereof is done. If only scrambling processing is done, it is not possible to completely handle pathological conditions, so that it cannot be said that the SMPTE 2036-3 standard is capable of completely handling pathological conditions. In contrast, in the first embodiment of the present invention, because 8B/10B encoding processing is always done, it is possible to completely handle pathological conditions.

(Video Signal Receiving Device)

Figure 26:
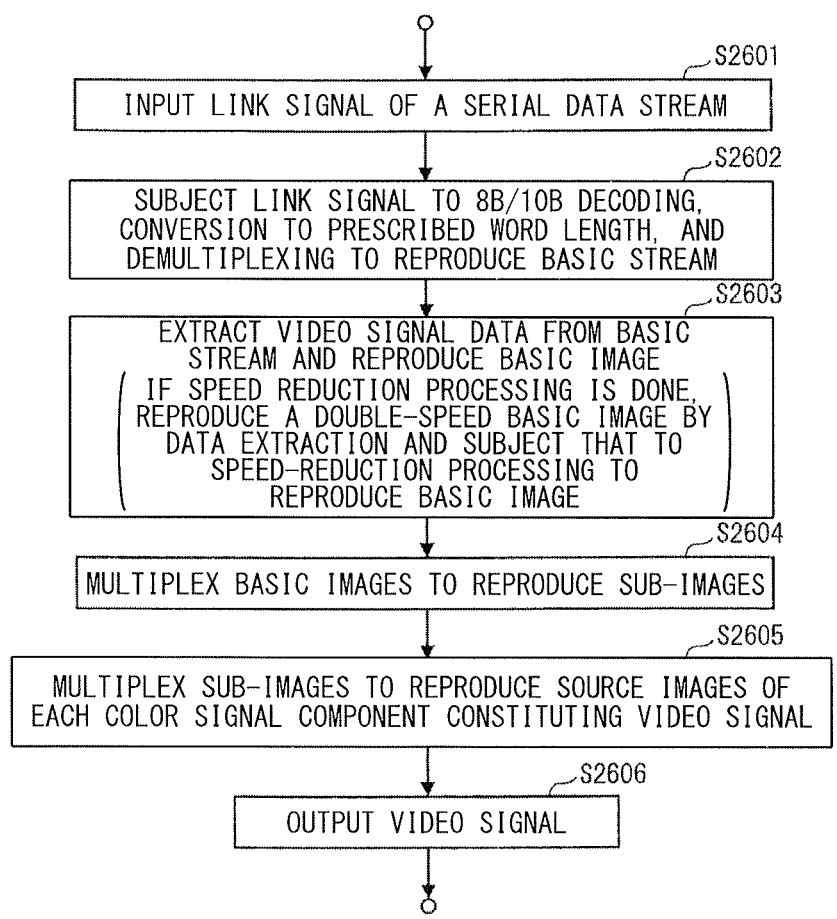
FIG. 26 is a flowchart showing the processing by the video signal receiving device.

Next, the video signal receiving device 2 shown in FIG. 1 will be described in detail. FIG. 25 is a block diagram showing the constitution of the video signal receiving device 2, and FIG. 26 is a flowchart describing the processing by the video signal receiving device 2. The video signal receiving device 2 has a basic stream reproduction unit 21, a basic image reproduction unit 22, a sub-image reproduction unit 23, and a source image reproduction unit 24.

When the video signal receiving device 2 receives from the video signal transmitting device 1 a video signal of a moving image constituted by one or more color signal components as a prescribed number of 10.692-Gbit/s link signals, the basic stream reproduction unit 21 inputs the link signals (step 2601). The basic stream reproduction unit 21 performs processing that is the reverse of the processing by the link signal generation unit 14 shown in FIG. 2, so as to perform decoding processing (for example, 8B/10B decoding processing) of the link signals, processing to convert 8-bit byte data to 12-bit data, and demultiplexing processing so as to reproduce the basic streams (step S2602).

The basic image reproduction unit 22 performs processing that is the reverse of the processing by the basic stream generation unit 13 shown in FIG. 2, so as to extract line data of pixels, which is video signal data, from the basic stream reproduced by the basic stream reproduction unit 21 and arrange the extracted pixel line data in a prescribed arrangement to reproduce basic images (step S2603). If processing is done to reduce the frame frequency (speed-halving processing), which is the reverse of the above-described speed-doubling processing, the basic image reproduction unit 22 performs processing as described above to reproduce the double-speed basic images. The basic image reproduction unit 22 subjects the reproduced double-speed basic images to speed-reduction processing to generate basic images. The speed-reduction processing refers to processing that is the reverse of the first speed-doubling processing shown in FIG. 14A to FIG. 14C or the second speed-doubling processing shown in FIG. 15 and FIG. 16A to FIG. 16C, and generates basic images from double-speed basic images. For example, a basic image operating at a frame frequency of 60 Hz is generated from double-speed basic image operating at a frame frequency of 120 Hz.

The sub-image reproduction unit 23 performs processing that is the reverse of processing performed by the basic image generation unit 12 shown in FIG. 2, so as to multiplex (synthesize) a plurality of basic images reproduced by the basic image reproduction unit 22 in a prescribed sequence to reproduce the sub-images (step S2604). Specifically, the sub-image reproduction unit 23 uses all the pixels constituting the plurality of basic images to arrange them in a prescribed two-dimensional arrangement and reproduce the sub-images.

The source image reproduction unit 24 performs processing that is the reverse of the processing performed by the sub-image generation unit 11 shown in FIG. 2 to multiplex (synthesize) a plurality of sub-images reproduced by the sub-image reproduction unit 23 in a prescribed sequence so as to reproduce the source images (step S2605). This reproduces a source image for each color signal component. The source image reproduction unit 24 outputs a source image for each reproduced color signal component as the original video signal (step S2606). In this manner, the video signal receiving device 2 receives a prescribed number of 10.692-

Gbit/s link signals and reproduces a video signal of a moving image constituted by a plurality of color signal components.

As described above, in the video signal receiving device 2 according to the first embodiment of the present invention, the basic stream reproduction unit 21 performs processing that is the reverse of the processing by the link signal generation unit 14, the basic image reproduction unit 22 performs processing that is the reverse of the processing by the basic stream generation unit 13, the sub-image reproduction unit 23 performs processing that is the reverse of the processing by the basic image generation unit 12, and the source image reproduction unit 24 performs processing that is the reverse of the processing by the sub-image generation unit 11. This reproduces the original video signal input by the video signal transmitting device 1 shown in FIG. 1 and FIG. 2. Therefore, similar to the video signal transmitting device 1, it is possible to handle each of a plurality of color signal components as independent video streams, so as to flexibly handle video signals of various formats, eliminating the need for de-mapping between color signal components dependent upon the video signal format, and facilitating processing.

The video signal receiving device 2 according to the first embodiment of the present invention, similar to the video signal transmitting device 1, can handle video signal of not only a frame frequency of 60 Hz, but also of a high frame frequency of 120 Hz. This enables the use of an interface having a common transmitting clock, even for a mixture of a video signal having a frame frequency of 60 Hz and a video signal having a frame frequency of 120 Hz.

The video signal receiving device 2 according to the first embodiment of the present invention, similar to the video signal transmitting device 1, in the case of a 4:2:0 or 4:2:2 format video signal having a small total number of pixels, does not require processing having the same load as with the 4:4:4 format, which has a large total number of pixels, thereby lowering the processing load and achieving efficient processing.

The video signal receiving device 2 according to the first embodiment of the present invention, similar to the video signal transmitting device 1, can completely handle pathological conditions.

Second Embodiment

In the above-described video signal transmitting device 1, if the basic image generation unit 12 performs basic image speed-doubling processing to generate a double-speed basic image, the link signal generation unit 14 performs multiplexing and the like of two basic streams to generate one link signal, such as shown in FIG. 5, FIG. 18, and FIG. 19. In contrast, in the video signal transmitting device 1 according to the second embodiment of the present invention, one basic stream is generated by the basic stream generation unit 13 from one basic image, without the basic image generation unit 12 generating a double-speed basic image. The link signal generation unit 14 then subjects four basic streams to multiplexing processing and the like to generate one link signal.

The video signal transmitting device 1 according to the second embodiment, similar to the constitution shown in FIG. 2, has a sub-image generation unit 11, a basic image generation unit 12, a basic stream generation unit 13, and a link signal generation unit 14.

Figure 27:
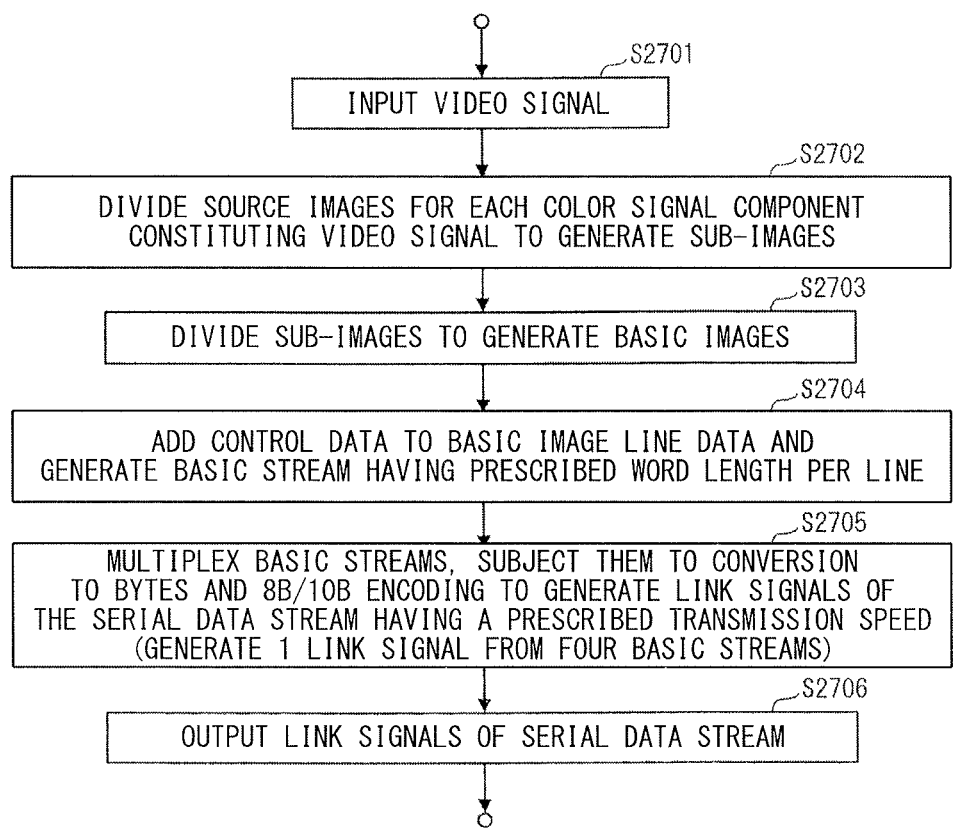
FIG. 27 is a flowchart showing the processing by a video signal transmitting device according to a second embodiment of the present invention.

FIG. 27 is a flowchart showing the processing by the video signal transmitting device 1 according to the second embodiment. Because the processing of step S2701 to step S2704 and step S2706 is the same as the processing of step S301 to S304 and step S306 shown in FIG. 3, the descriptions thereof will be omitted. The sub-image generation unit 11 and the basic stream generation unit 13 perform processing that is the same as the processing shown in FIG. 3. The basic image generation unit 12 does not perform speed-doubling processing at step S2703. That is, the basic image generation unit 12 inputs a plurality of sub-images, for each color signal component generated by the sub-image generation unit 11, divides each of the sub-images to generate a plurality of basic images, and outputs the plurality of generated basic images to the basic stream generation unit 13.

At step S2705, the link signal generation unit 14 subjects the basic streams generated by the basic stream generation unit 13 (four different basic streams each generated from different basic images) to multiplexing processing (synthesis processing), arrangement processing by byte conversion, and 8B/10B encoding processing, so as to generate link signals of a prescribed transmission speed.

Figure 28:
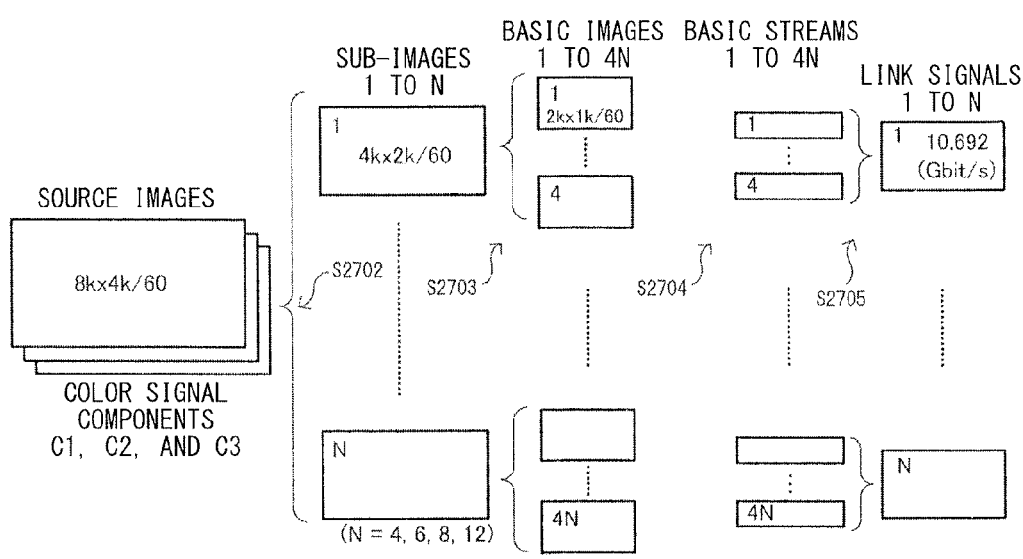
FIG. 28 is a drawing describing the mapping procedure of the case of a video signal having a source image of 8 k×4 k pixels and operating at a frame frequency of 60 Hz in the second embodiment.

FIG. 28 describes the mapping procedure in the second embodiment for the case of a video signal having a source image having 8 k×4 k pixels and operating at a frame frequency of 60 Hz. It is assumed here that, in the color signal components C1, C2, and C3 constituting the video signal, the source image of one frame thereof has 8 k×4 k pixels and operates at a frame frequency of 60 Hz (60 frames per second).

As shown in FIG. 28, the processing of step S2702 by the sub-image generation unit 11 generates from a source image N sub-images having 4 k×2 k pixels and operating at a frame frequency of 60 Hz. The processing of step S2703 by the basic image generation unit 12 generates from a sub-image four basic images having 2 k×1 k pixels and operating at a frame frequency of 60 Hz. That is, a total of 4N basic images are generated from N sub-images.

The processing of step S2704 by the basic stream generation unit 13 generates basic streams from basic images. That is, 4N corresponding basic streams are generated from 4N basic images. Then, the processing of step S2705 by the link signal generation unit 14 generates one link signal from four basic streams, the link signal being transmitted at a speed of 10.692 Gbit/s. That is, N link signals are generated from 4N basic streams.

Figure 29:
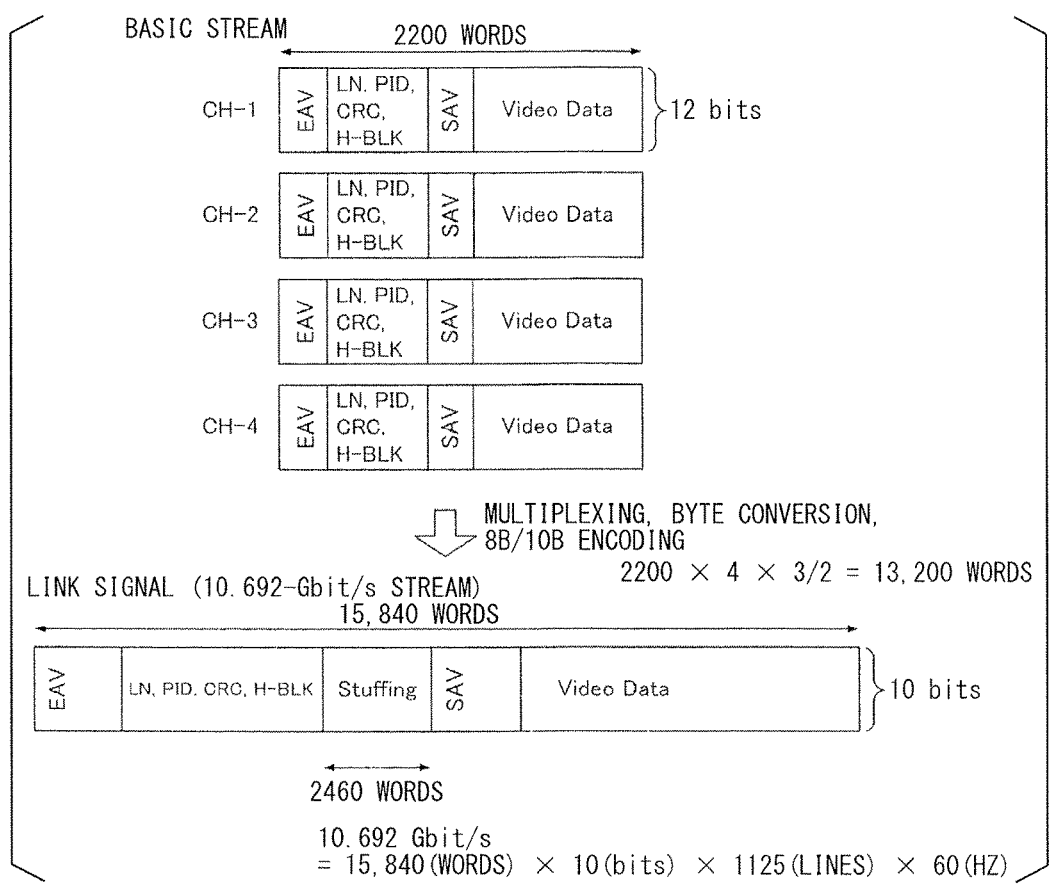
FIG. 29 is a drawing describing the processing by the link signal generation unit in the second embodiment.
Figure 30:
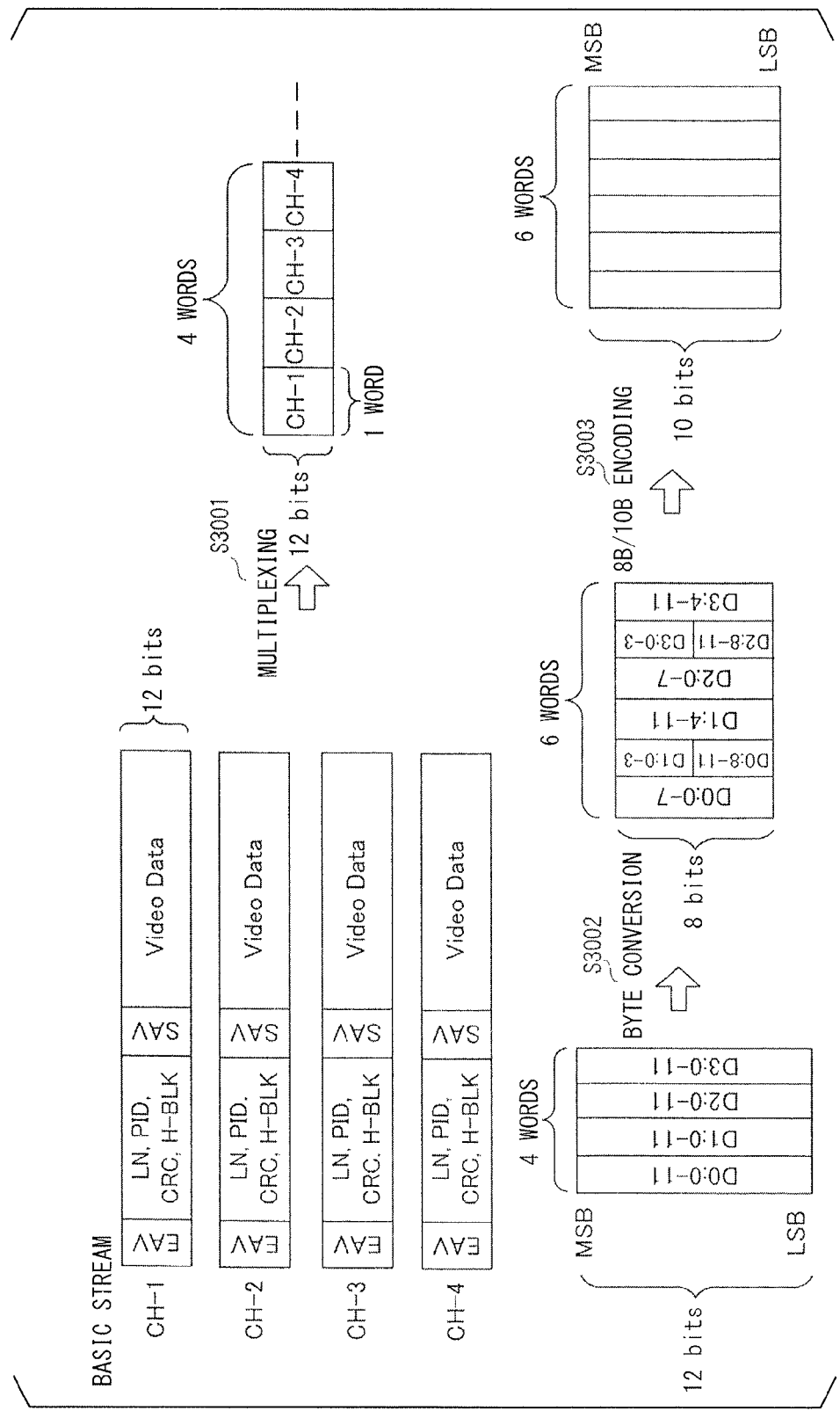
FIG. 30 is a drawing describing the details of the processing by the link signal generation unit in the second embodiment.

FIG. 29 describes the processing by the link signal generation unit 14 in the second embodiment (step S2705 shown in FIG. 27), and FIG. 30 describes details of the processing by the link signal generation unit 14. The link signal generation unit 14 inputs basic streams of each of the four channels CH-1 to CH-4 corresponding to four different basic images, and subjects one word of data of each basic stream to multiplexing processing (step S3001). The multiplexing processing is successively performed for each word, from the leading part to the trailing part of the basic stream.

The link signal generation unit 14 subjects four words of multiplexed data to arrangement processing by byte conversion, generating a total of six words of data having eight bits per word (step S3002). The link signal generation unit 14, for each data of a total of six words having eight bits per word, performs 8B/10B encoding processing to generate data for a total of six words having 10 bits per word (step S3003). The link signal generation unit 14 then performs the processing of step S3001 to step S3003 from the leading part to the trailing part of the basic streams of CH-1 to CH-4, generates 13,200 words of data having 10 bits per word, adds thereto 2640 words of stuffing data, and, as shown in FIG. 29, generates a 10.692-Gbit/s link signal having 15,840 words per line.

Figure 31:
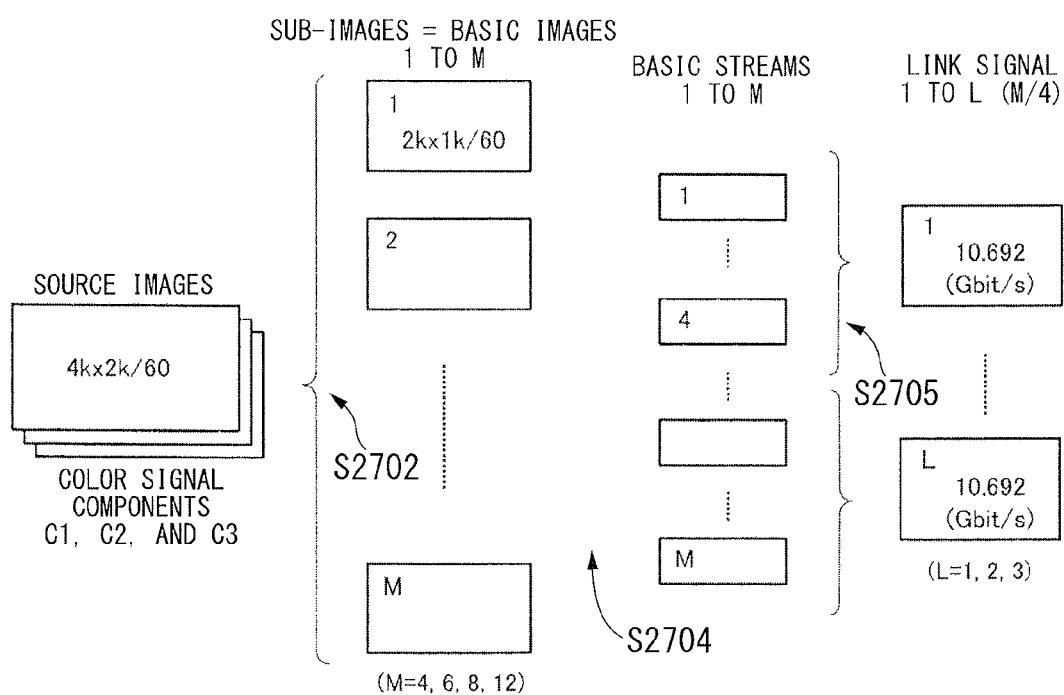
FIG. 31 is a drawing describing the mapping procedure of the case of a video signal having a source image of 4×2 k pixels and operating at a frame frequency of 60 Hz in the second embodiment.

FIG. 31 describes the mapping procedure for the case of a video signal having a source image of 4 k×2 k pixels and operating at a frame frequency of 60 Hz. The processing of step S2702 by the sub-image generation unit 11 divides a 4 k×2 k source image into M 2 k×1 k sub-images. These 2 k×1 k sub-images correspond to basic images. The processing of step S2704 by the basic stream generation unit 13 generates basic streams from basic images. That is, M corresponding basic streams are generated from M basic images. The processing of step S2705 by the link signal generation unit 14 generates one link signal from four basic streams, this link signal being transmitted at a speed of 10.692 Gbit/s. That is, L=M/4 link signals are generated from M basic streams.

As described above, in the video signal transmitting device 1 according to the second embodiment of the present invention, similar to the case of the above-described first embodiment, there is no need to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal transmitting device 1 according to the second embodiment of the present invention, the link signal generation unit 14 subjects four basic streams to multiplexing processing, instead of the basic image generation unit 12 performing speed-doubling processing, so as to generate one link signal. This enables a reduction of the processing load on the basic image generation unit 12 and enables the handling as well of a video signal with a 60-Hz frame frequency.

Next, the video signal receiving device 2 corresponding to the above-described video signal transmitting device 1 according to the second embodiment will be described. The video signal receiving device 2 according to the second embodiment of the present invention, similar to the constitution shown in FIG. 25, has a basic stream reproduction unit 21, a basic image reproduction unit 22, a sub-image reproduction unit 23, and a source image reproduction unit 24.

The video signal receiving device 2 receives from the video signal transmitting device 1 a video signal of a moving image constituted by one or more color signal component in a prescribed number of 10.692-Gbit/s link signals. The basic stream reproduction unit 21 of the video signal receiving device 2 inputs the link signals and, by performing processing that is the reverse of the processing by the link signal generation unit 14 on the transmitting side shown in FIG. 29 and FIG. 30, subjects one link signal to decoding processing (for example, 8B/10B decoding processing), processing to convert 8-bit byte data to 12-bit data, and demultiplexing processing, so as to reproduce four basic streams.

The basic image reproduction unit 22 performs processing that is the reverse of the processing by the basic stream generation unit 13 on the transmitting side, so as to extract line data of pixels, which is video signal data, from the basic streams reproduced by the basic stream reproduction unit 21, and arranges the extracted pixel line data in a prescribed arrangement to reproduce the basic images. In this case, because the transmitting-side basic image generation unit 12 does not perform speed-doubling processing, the basic image reproduction unit 22 does not perform the processing noted in parenthesis in step S2603 (speed-reduction processing (speed-halving processing)) of the flowchart shown in FIG. 26.

By performing processing that is the reverse of the processing by the basic image generation unit 12 on the transmitting side, the sub-image reproduction unit 23 performs multiplexing (synthesizing) of a plurality of basic images reproduced by the basic image reproduction unit 22 in a prescribed sequence to reproduce the sub-images. The source image reproduction unit 24 performs processing that is the reverse of the processing by the sub-image generation unit 11 on the transmitting side in a prescribed sequence to multiplex (synthesize) the plurality of sub-images reproduced by the sub-image reproduction unit 23 in the prescribed sequence and reproduce the source images.

This reproduces the source images of each color signal component. The source image reproduction unit 24 outputs the source images of each of the reproduced color signal components as the original video signal. In this manner, the video signal receiving device 2 according to the second embodiment receives a prescribed number of 10.692-Gbit/s link signals and reproduces the video signal of a moving image constituted by a plurality of color signal components.

As described above, in the video signal receiving device 2 according to the second embodiment of the present invention, similar to the case of the above-described first embodiment, it is not necessary to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal receiving device 2 according to the second embodiment of the present invention, the source image reproduction unit 24 subjects one link signal to decoding processing and the like, instead of the basic image reproduction unit 22 performing speed-reduction processing, so as to reproduce four basic streams. This enables a reduction of the processing load on the basic image reproduction unit 22 and enables the handling as well of a video signal with a 60-Hz frame frequency.

Third Embodiment

Next, the third embodiment of the present invention will be described. In the third embodiment, the descriptions of the constituent elements and parts used in processing that are the same as in the above-described embodiments will be omitted.

In the video signal transmitting device 1 according to the third embodiment of the present invention, the basic stream generation unit 13 generates one basic stream from one basic image, without the basic image generation unit 12 generating a double-speed basic image. The link signal generation unit 14 subjects four basic streams to multiplexing processing and the like to generate one link signal.

The video signal transmitting device 1 according to the third embodiment, similar to the constitution shown in FIG. 2, has a sub-image generation unit 11, a basic image generation unit 12, a basic stream generation unit 13, and a link signal generation unit 14.

Because the processing by the video signal transmitting device 1 according to the third embodiment is the same as the processing in the flowchart (FIG. 27) showing the processing by the video signal transmitting device 1 according to the second embodiment, the description thereof will be omitted.

Figure 32:
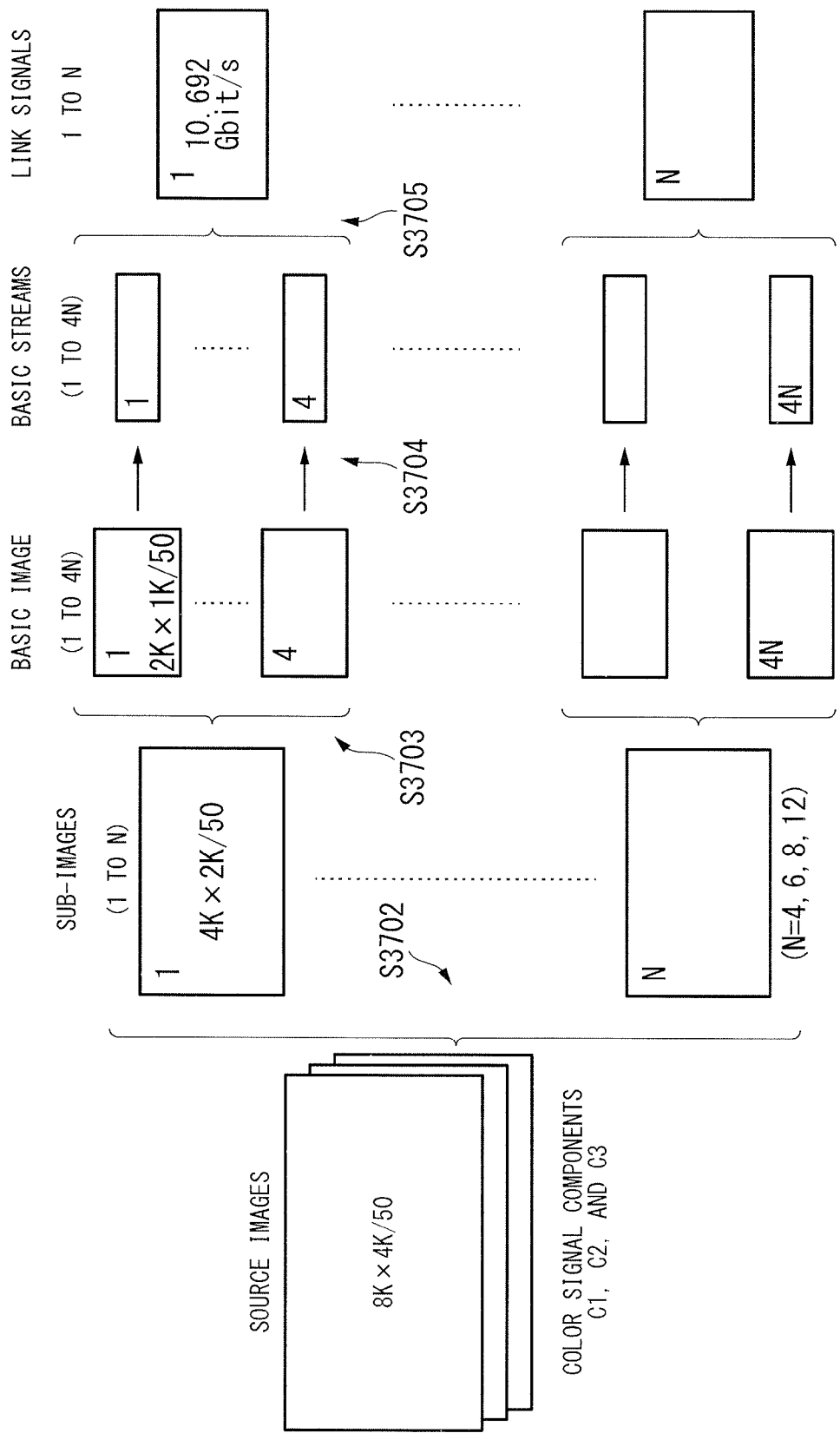
FIG. 32 is a drawing describing the mapping procedure of the case of a video signal having a source image of 8×4 k pixels and operating at a frame frequency of 50 Hz in the third embodiment.

FIG. 32 describes the mapping procedure in the third embodiment for the case of a video signal having a source image of 8 k×4 k pixels and operating at a frame frequency of 50 Hz. It is assumed here that, in the color signal components C1, C2, and C3 constituting the video signal, the source image of one frame has 8 k×4 k pixels and operates at a frame frequency of 50 Hz (50 frames per second).

As shown in FIG. 32, the processing of step S3702 by the sub-image generation unit 11 (corresponding to step S2702 of FIG. 27) generates N sub-images from a source image, the sub-images having 4 k×2 k pixels and operating at a frame frequency of 50 Hz. The processing of step S3703 by the basic image generation unit 12 (corresponding to step S2703 of FIG. 27) generates four basic images from a sub-image, the basic images having 2 k×1 k pixels and operating at a frame frequency of 50 Hz. That is, a total of 4N basic images are generated from N sub-images.

The processing of step S3704 by the basic stream generation unit 13 (corresponding to step S2704 of FIG. 27) generates the basic streams from a basic image. That is, 4N corresponding basic streams are generated from 4N basic images. The processing of step S3705 by the link signal generation unit 14 (corresponding to step S2705 in FIG. 27) generates, from four basic streams, one link signal, which is transmitted at a speed of 10.692 Gbit/s. That is, N link signals are generated from 4N basic streams.

Figure 33:
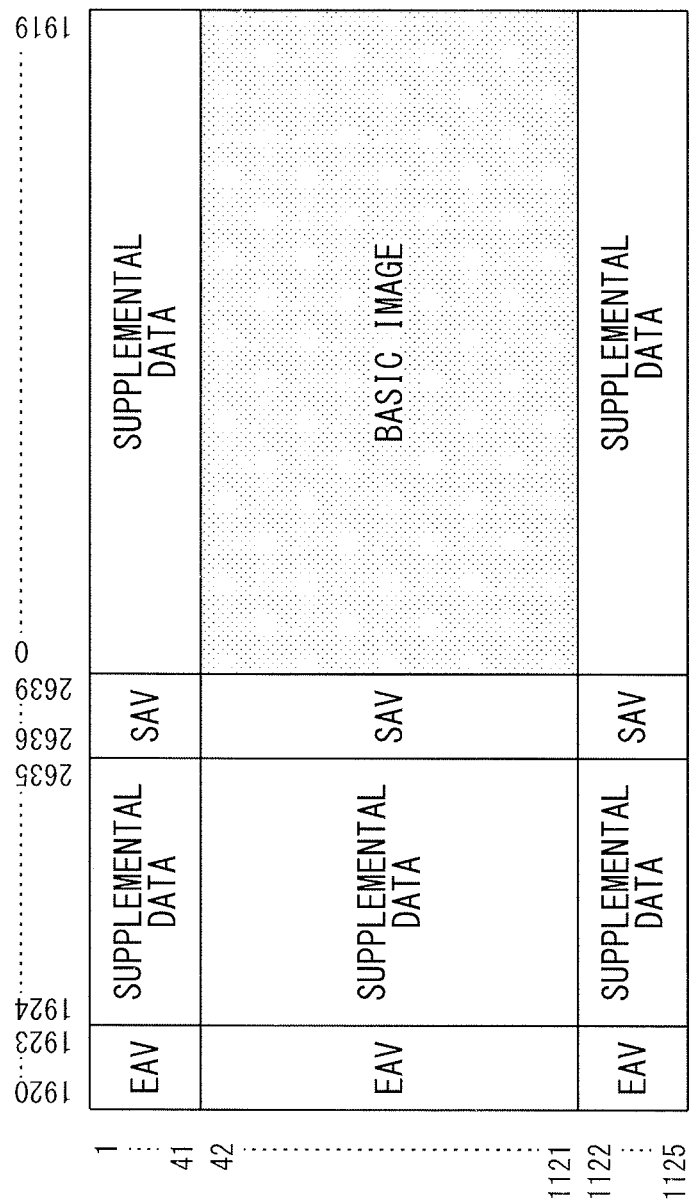
FIG. 33 is a drawing describing the processing by the basic stream generation unit according to the third embodiment.

FIG. 33 describes the processing by the basic stream generation unit 13 according to the third embodiment of the present invention (corresponding to step S304 shown in FIG. 3). The basic stream generation unit 13 extracts pixels for each line in the lateral direction (horizontal direction) with respect to the basic images having 2 k×1 k pixels. The basic stream generation unit 13 then adds to the extracted pixel data timing reference signals, such as the control data EAV (end of active video), supplemental data, and SAV (start of active video), so as to constitute by line a basic stream having a total length of 2640 words.

In a basic stream shown in FIG. 33, in lines 1 to 41, EAV is placed in columns 1920 to 1923, supplemental data is placed in columns 1924 to 2635, SAV is placed in columns 2636 to 2639, and supplemental data is placed in columns 0 to 1919.

In a basic stream shown in FIG. 33, in lines 42 to 1121, EAV is placed in columns 1920 to 1923, supplemental data is placed in columns 1924 to 2635, SAV is placed in columns 2636 to 2639, and the basic image is placed in columns 0 to 1919.

In the basic stream shown in FIG. 33, in lines 1122 to 1125, EAV is placed in columns 1920 to 1923, supplemental data is placed in columns 1924 to 2635, SAV is placed in columns 2636 to 2639, and supplemental data is placed in columns 0 to 1919.

Figure 34:
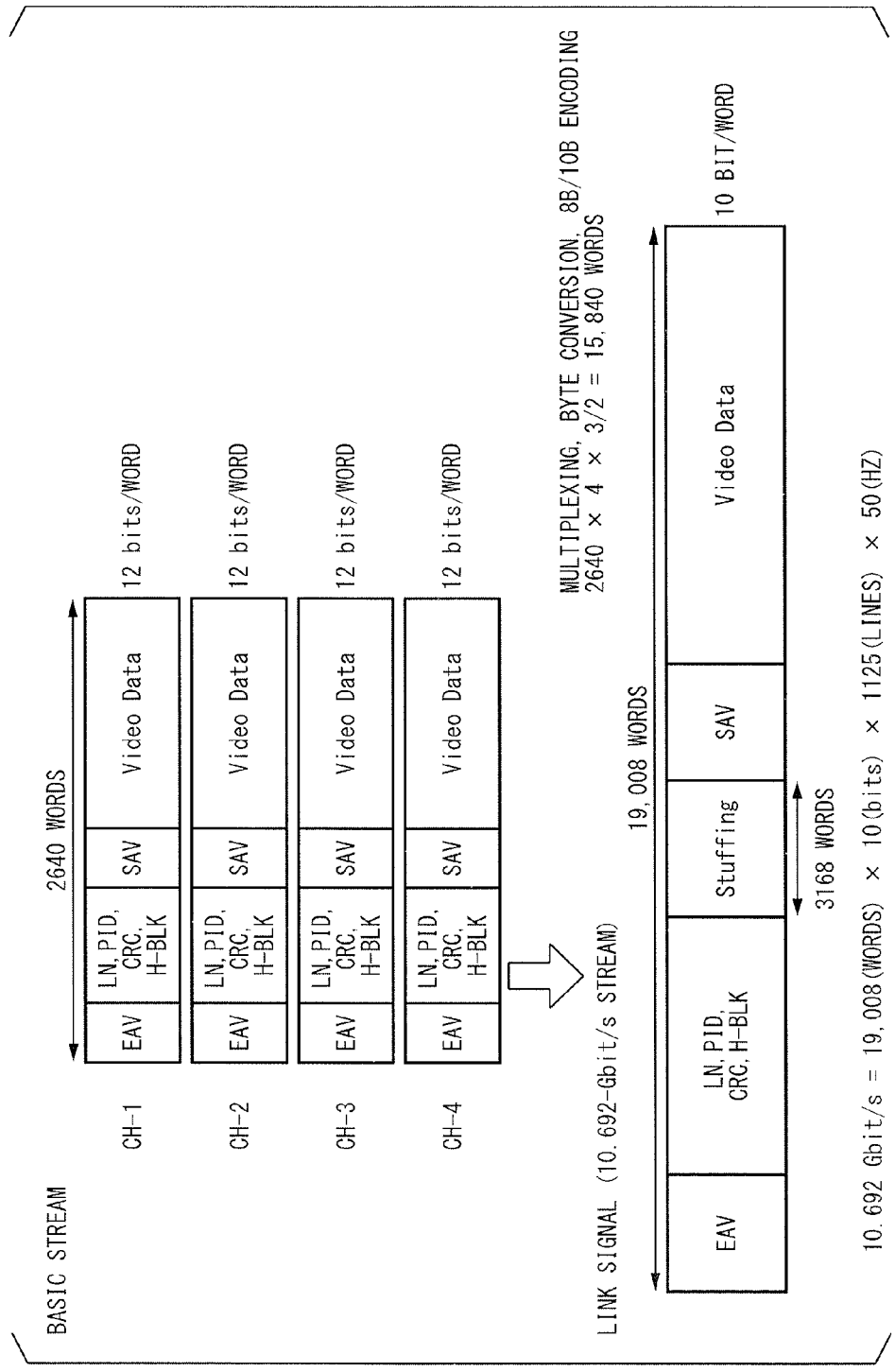
FIG. 34 is a drawing describing the processing by the link signal generation unit according to the third embodiment.

FIG. 34 describes the processing by the link signal generation unit 14 in the third embodiment of the present invention (step S3705 shown in FIG. 32). The link signal generation unit 14 inputs four basic streams of CH-1 to CH-4, corresponding to four different basic images, and subjects one word of data of each basic stream to multiplexing processing (corresponding to step S3001 of FIG. 30). The multiplexing processing is performed successively by individual words from the leading part to the trailing part of the basic streams.

In all of the four basic streams of CH-1 to CH-4 of FIG. 34, data is included in the sequence of "EAV", "LN, PID, CRC, H-BLK", "SAV", and "video data".

The link signal generation unit 14 subjects the four words of multiplexed data to arrangement processing by byte conversion to generate a total of six words of data having eight bits per word (corresponding to step S3002 of FIG. 30). The link signal generation unit 14 subjects each data of the total of six words of data having eight bits per word to 8B/10B encoding processing (corresponding to step S3003 of FIG. 30) to generate data of a total of six words having 10 bits per word. The link signal generation unit 14 performs processing corresponding to step S3001 to step S3003 of FIG. 30 from the leading part to the trailing part of the basic streams of CH-1 to CH-4 to generate 15,840 (=2640×4×3/2) words of data having 10 bits per word, adds thereto 3168 words of stuffing data, and, as shown FIG. 34, generates a 10.692-Gbit/s (=19,008 words×10 bits×1125 lines×50 Hz) link signal having 19,008 words per line.

In FIG. 34, data is included in the link signal in the sequence of "EAV", "LN, PID, CRC, H-BLK", "SAV", and "video data".

As described above, in the video signal transmitting device 1 according to the third embodiment of the present invention, similar to the case of the above-described first embodiment, there is no need to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal transmitting device 1 according to the third embodiment of the present invention, the link signal generation unit 14 subjects four basic streams to multiplexing processing, instead of the basic image generation unit 12 performing speed-doubling processing, so as to generate one link signal. This enables a reduction of the processing load on the basic image generation unit 12 and enables the handling as well of a video signal with a 50-Hz frame frequency.

Next, the video signal receiving device 2 corresponding to the above-described video signal transmitting device 1 according to the third embodiment will be described. The video signal receiving device 2 according to the third embodiment of the present invention, similar to the constitution shown in FIG. 25, has a basic stream reproduction unit 21, a basic image reproduction unit 22, a sub-image reproduction unit 23, and a source image reproduction unit 24.

The video signal receiving device 2 according to the third embodiment receives a video signal of a moving image constituted by one or more color signal component as a prescribed number of 10.692-Gbit/s link signals from the video signal transmitting device 1 according to the third embodiment. The basic stream reproduction unit 21 of the video signal receiving device 2 according to the third embodiment inputs the link signals and, by performing processing that is the reverse of the processing by the link signal generation unit 14 on the transmitting side shown in FIG. 34, subjects one link signal to decoding processing (for example, 8B/10B decoding processing), processing to convert 8-bit byte data to 12-bit data, and demultiplexing processing, so as to reproduce four basic streams.

The basic image reproduction unit 22 performs processing that is the reverse of the processing by the basic stream generation unit 13 on the transmitting side, so as to extract line data of pixels, which is video signal data, from the basic streams reproduced by the basic stream reproduction unit 21, and arranges the extracted pixel line data in a prescribed arrangement to reproduce the basic images. In this case, because the transmitting-side basic image generation unit 12 does not perform speed-doubling processing, the basic image reproduction unit 22 does not perform the processing noted in parenthesis in step S2603 (speed-reduction processing (speed-halving processing)) of the flowchart shown in FIG. 26.

By performing processing that is the reverse of the processing by the basic image generation unit 12 on the transmitting side, the sub-image reproduction unit 23 performs multiplexing (synthesizing) of a plurality of basic images reproduced by the basic image reproduction unit 22 in a prescribed sequence to reproduce the sub-images. The source image reproduction unit 24 performs processing that is the reverse of the processing by the sub-image generation unit 11 on the transmitting side in a prescribed sequence to multiplex (synthesize) the plurality of sub-images reproduced by the sub-image reproduction unit 23 in the prescribed sequence and reproduce the source images.

The above reproduces the source images of each color signal component. The source image reproduction unit 24 outputs the source images of each of the reproduced color signal components as the original video signal. In this manner, the video signal receiving device 2 according to the third embodiment receives a prescribed number of 10.692-Gbit/s link signals and reproduces the video signal of a moving image constituted by a plurality of color signal components.

As described above, in the video signal receiving device 2 according to the third embodiment of the present invention, similar to the case of the above-described first embodiment, it is not necessary to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal receiving device 2 according to the third embodiment of the present invention, the source image reproduction unit 24 subjects one link signal to decoding processing and the like, instead of the basic image reproduction unit 22 performing speed-reduction processing, so as to reproduce four basic streams. This enables a reduction of the processing load on the basic image reproduction unit 22 and enables the handling as well of a video signal with a 50-Hz frame frequency.

Fourth Embodiment

Next, the fourth embodiment of the present invention will be described. In the fourth embodiment, the descriptions of the constituent elements and parts used in processing that are the same as in the above-described embodiments will be omitted.

In the video signal transmitting device 1 according to the fourth embodiment of the present invention, the basic stream generation unit 13 generates one basic stream from one basic image, without the basic image generation unit 12 generating a double-speed basic image. The link signal generation unit 14 subjects eight basic streams to multiplexing processing and the like to generate one link signal.

The video signal transmitting device 1 according to the fourth embodiment, similar to the constitution shown in FIG. 2, has a sub-image generation unit 11, a basic image generation unit 12, a basic stream generation unit 13, and a link signal generation unit 14.

Because the processing by the video signal transmitting device 1 according to the fourth embodiment is the same as the processing in the flowchart (FIG. 27) showing the processing by the video signal transmitting device 1 according to the second embodiment, the description thereof will be omitted.

Figure 35:
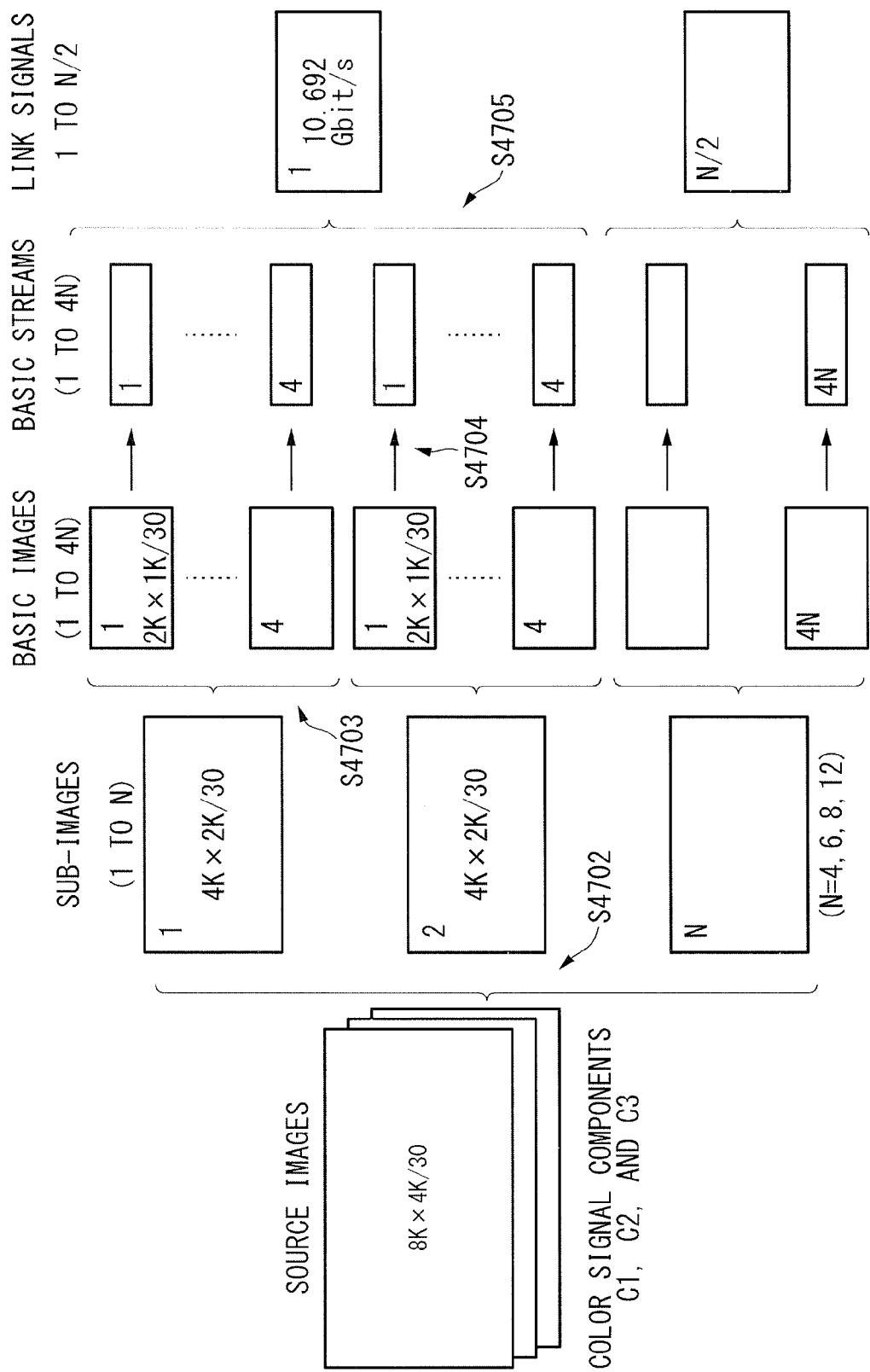
FIG. 35 is a drawing describing the mapping procedure of the case of a video signal having a source image of 8×4 k pixels and operating at a frame frequency of 30 Hz in a fourth embodiment.

FIG. 35 describes the mapping procedure in the fourth embodiment for the case of a video signal with a source image having 8 k×4 k pixels and operating at a frame frequency of 30 Hz. It is assumed here that, in the color signal components C1, C2, and C3 constituting the video signal, the source image of one frame has 8 k×4 k pixels and operates at a frame frequency of 30 Hz (30 frames per second).

As shown in FIG. 35, the processing of step S4702 by the sub-image generation unit 11 (corresponding to the processing of step S2702 of FIG. 27) generates N sub-images from a source image, the sub-images having 4 k×2 k pixels and operating at a frame frequency of 30 Hz. The processing of step S4703 by the basic image generation unit 12 (corresponding to the processing of step S2703 of FIG. 27) generates four basic images, the basic images having 2 k×1 k pixels and operating at a frame frequency of 30 Hz. That is, a total of 4N basic images are generated from N sub-images.

The processing of step S4704 by the basic stream generation unit 13 (corresponding to step S2704 of FIG. 27) generates the basic streams from the basic images. That is, 4N corresponding basic streams are generated from 4N basic images. The processing of step S4705 by the link signal generation unit 14 (corresponding to step S2705 of FIG. 27) generates one link signal, which is transmitted at a speed of 10.692 Gbit/s, from eight basic streams. That is, N/2 link signals are generated from 4N basic streams.

Figure 36:
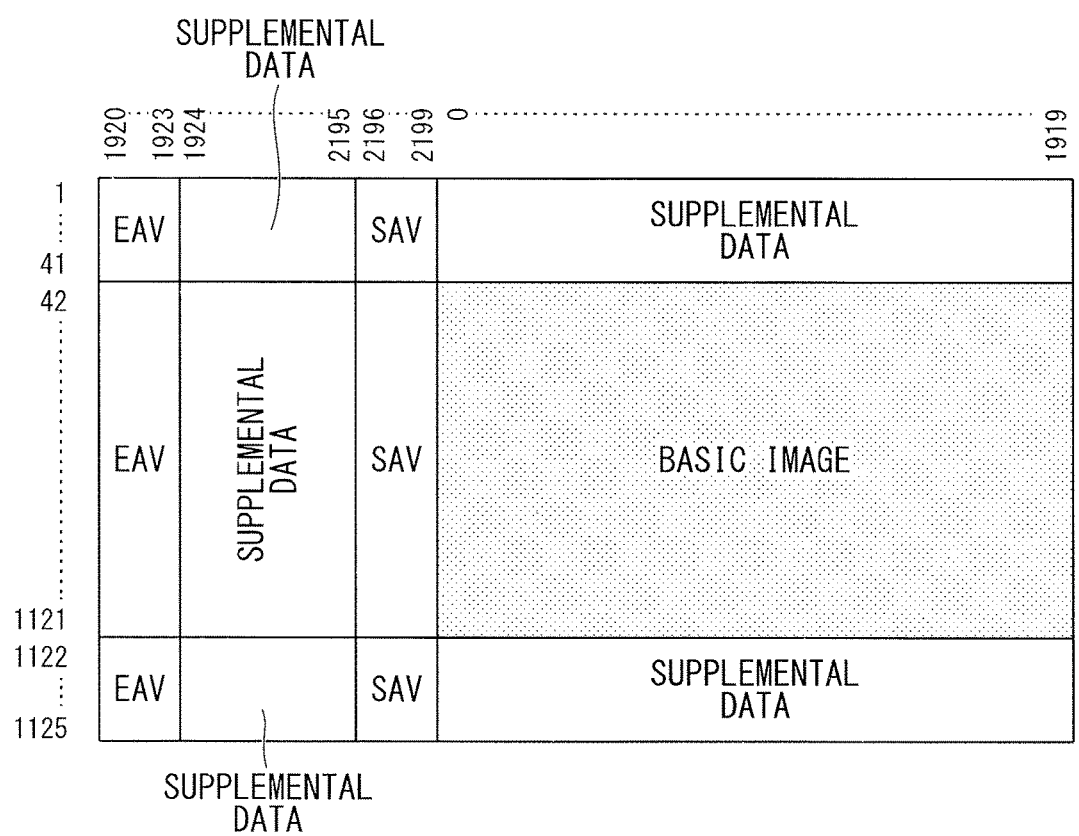
FIG. 36 is a drawing describing the processing by the basic stream generation unit according to the fourth embodiment.

FIG. 36 describes the processing by the basic stream generation unit 13 according to the fourth embodiment of the present invention (corresponding to step S304 shown in FIG. 3). The basic stream generation unit 13 extracts pixels for each line in the lateral direction (horizontal direction) with respect to the basic images having 2 k×1 k pixels. The basic stream generation unit 13 then adds to the extracted pixel data timing reference signals, such as the control data EAV (end of active video), supplemental data, and SAV (start of active video) and constitutes, by line, a basic stream having a total length of 2200 words.

In a basic stream shown in FIG. 36, in lines 1 to 41, EAV is placed in columns 1920 to 1923, supplemental data is placed in columns 1924 to 2195, SAV is placed in columns 2196 to 2199, and supplemental data is placed in columns 0 to 1919.

In a basic stream shown in FIG. 36, in lines 42 to 1121, EAV is placed in columns 1920 to 1923, supplemental data is placed in columns 1924 to 2195, SAV is placed in columns 2196 to 2199, and the basic image is placed in columns 0 to 1919.

In the basic stream shown in FIG. 36, in lines 1122 to 1125, EAV is placed in columns 1920 to 1923, supplemental data is placed in columns 1924 to 2195, SAV is placed in columns 2196 to 2199, and supplemental data is placed in columns 0 to 1919.

Figure 37:
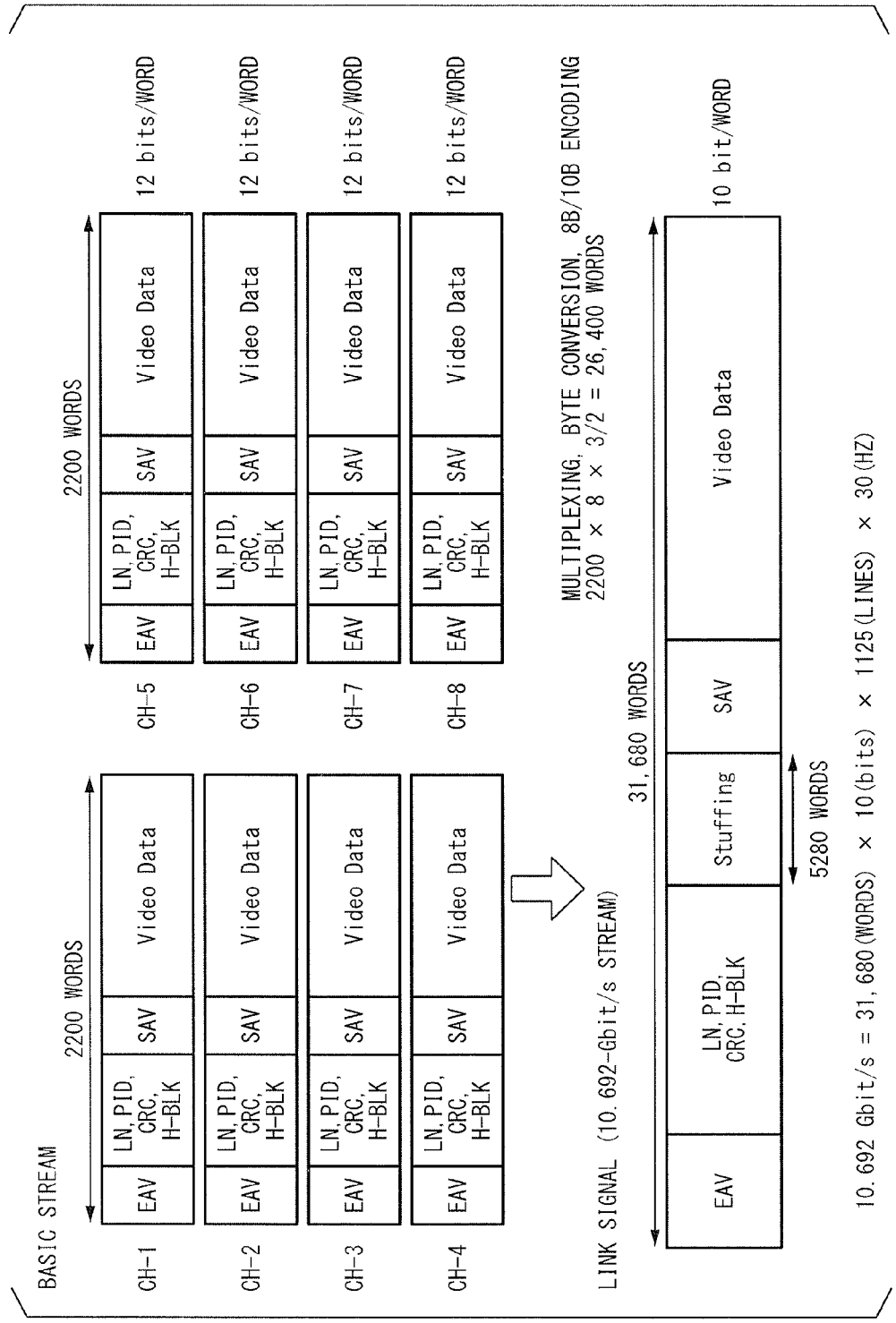
FIG. 37 is a drawing describing the processing by the link signal generation unit in the fourth embodiment.

FIG. 37 describes the processing by the link signal generation unit 14 in the fourth embodiment of the present invention (step S4705 shown in FIG. 35). The link signal generation unit 14 inputs eight basic streams of CH-1 to CH-8, corresponding to eight different basic images, and subjects one word of data of each basic stream to multiplexing processing (corresponding to step S3001 of FIG. 30). The multiplexing processing is performed successively from the leading part to the trailing part of the basic streams.

In all of the eight basic streams of CH-1 to CH-8 of FIG. 37, data is included in the sequence of "EAV", "LN, PID, CRC, H-BLK", "SAV", and "video data".

The link signal generation unit 14 subjects the eight words of multiplexed data to arrangement processing by byte conversion to generate a total of 12 words of data having eight bits per word (corresponding to step S3002 of FIG. 30). The link signal generation unit 14, subjects each of the data of the total of 12 words of data having eight bits per word to 8B/10B encoding processing to generate data of a total of 12 words having 10 bits per word (corresponding to step S3003 of FIG. 30). The link signal generation unit 14 performs processing corresponding to step S3001 to step S3003 of FIG. 30 from the leading part to the trailing part of the basic streams of CH-1 to CH-8 to generate 26,400 (=2200×8×3/2) words of data having 10 bits per word, adds thereto 5280 words of stuffing data, and, as shown in FIG. 37, generates a 10.692-Gbit/s (=31,680 words×10 bits×1125 lines×30 Hz) link signal having 31,680 words per line.

In FIG. 37, data is included in the link signal in the sequence of "EAV", "LN, PID, CRC, H-BLK", "SAV", and "video data".

As described above, in the video signal transmitting device 1 according to the fourth embodiment of the present invention, similar to the case of the above-described first embodiment, there is no need to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal transmitting device 1 according to the fourth embodiment of the present invention, the link signal generation unit 14 subjects eight basic streams to multiplexing processing, instead of the basic image generation unit 12 performing speed-doubling processing, so as to generate one link signal. This enables a reduction of the processing load on the basic image generation unit 12 and enables the handling as well of a video signal with a 30-Hz frame frequency.

Next, the video signal receiving device 2 corresponding to the above-described video signal transmitting device 1 according to the fourth embodiment will be described. The video signal receiving device 2 according to the fourth embodiment of the present invention, similar to the constitution shown in FIG. 25, has a basic stream reproduction unit 21, a basic image reproduction unit 22, a sub-image reproduction unit 23, and a source image reproduction unit 24.

The video signal receiving device 2 according to the fourth embodiment receives a video signal of a moving image constituted by one or more color signal component as a prescribed number of 10.692-Gbit/s link signals from the video signal transmitting device 1 according to the fourth embodiment. The basic stream reproduction unit 21 of the video signal receiving device 2 according to the fourth embodiment inputs the link signals and, by performing processing that is the reverse of the processing by the link signal generation unit 14 on the transmitting side shown in FIG. 37, subjects one link signal to decoding processing (for example, 8B/10B decoding processing), processing to convert 8-bit byte data to 12-bit byte data, and demultiplexing processing, so as to reproduce eight basic streams.

The basic image reproduction unit 22 performs processing that is the reverse of the processing by the basic stream generation unit 13 on the transmitting side, so as to extract line data of pixels, which is video signal data, from the basic streams reproduced by the basic stream reproduction unit 21, and arranges the extracted pixel line data in a prescribed arrangement to reproduce the basic images. In this case, because the transmitting-side basic image generation unit 12 does not perform speed-doubling processing, the basic image reproduction unit 22 does not perform the processing noted in parenthesis in step S2603 (speed-reduction processing (speed-halving processing)) of the flowchart shown in FIG. 26.

By performing processing that is the reverse of the processing by the basic image generation unit 12 on the transmitting side, the sub-image reproduction unit 23 performs multiplexing (synthesizing) of a plurality of basic images reproduced by the basic image reproduction unit 22 in a prescribed sequence to reproduce the sub-images. The source image reproduction unit 24 performs processing that is the reverse of the processing by the sub-image generation unit 11 on the transmitting side to multiplex (synthesize) the plurality of sub-images reproduced by the sub-image reproduction unit 23 in the prescribed sequence and reproduce the source images.

The above reproduces the source images of each color signal component. The source image reproduction unit 24 then outputs the source images of each of the reproduced color signal components as the original video signal. In this manner, the video signal receiving device 2 according to the fourth embodiment receives a prescribed number of 10.692-Gbit/s link signals and reproduces the video signal of a moving image constituted by a plurality of color signal components.

As described above, in the video signal receiving device 2 according to the fourth embodiment of the present invention, similar to the case of the above-described first embodiment, it is not necessary to reconstruct one pixel into a plurality of data words, the transmission capacity for the case of a video signal with a format having a small total number of pixels (for example, the 4:2:2 format and the 4:2:0 format) can be reduced, and it is possible to handle pathological conditions.

In the video signal receiving device 2 according to the fourth embodiment of the present invention, the source image reproduction unit 24 subjects one link signal to decoding processing and the like, instead of the basic image reproduction unit 22 performing speed-reduction processing, so as to reproduce eight basic streams. This enables a reduction of the processing load on the basic image reproduction unit 22 and enables the handling as well of a video signal with a 30-Hz frame frequency.

Although the fourth embodiment of the present invention has been described for the case in which the source image of a video signal has 8 k×4 k pixels and operates at a frame frequency of 30 Hz, this is not a restriction.

For example, the source image of the video signal may have 8 k×4 k pixels and operate at a frame frequency of 25 Hz or have 8 k×4 k pixels and operate at a frame frequency of 24 Hz.

Figure 38:
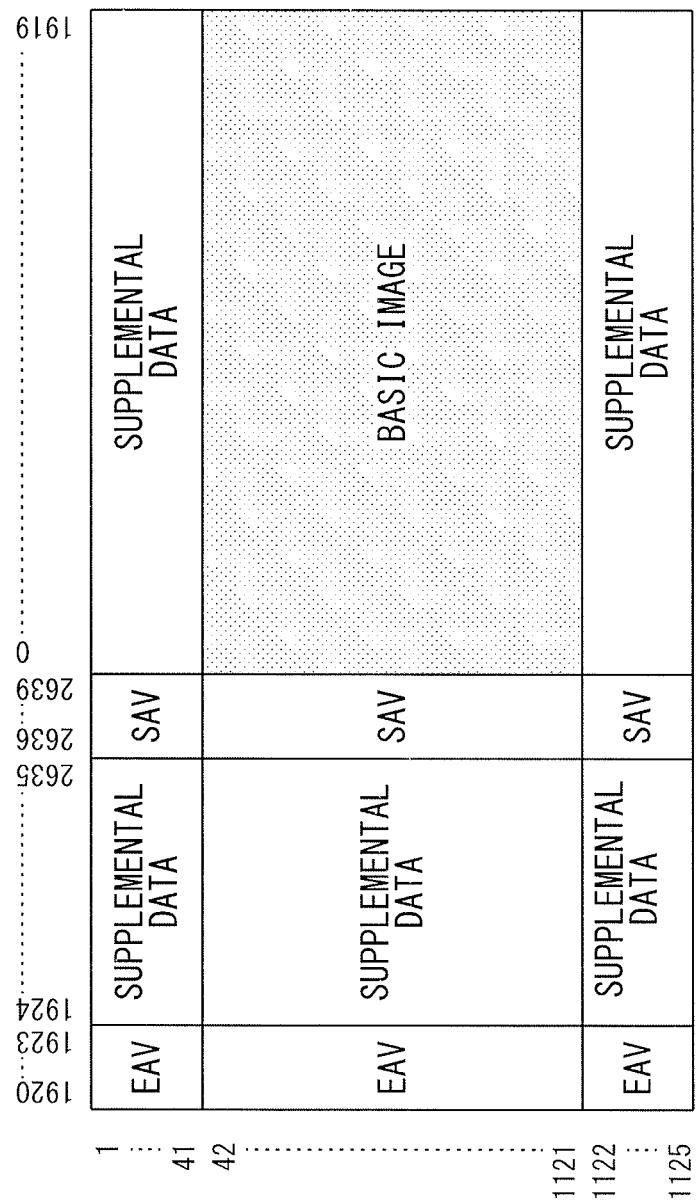
FIG. 38 is a drawing describing the processing by the basic stream generation unit according to a first variation example of the fourth embodiment.
Figure 39:
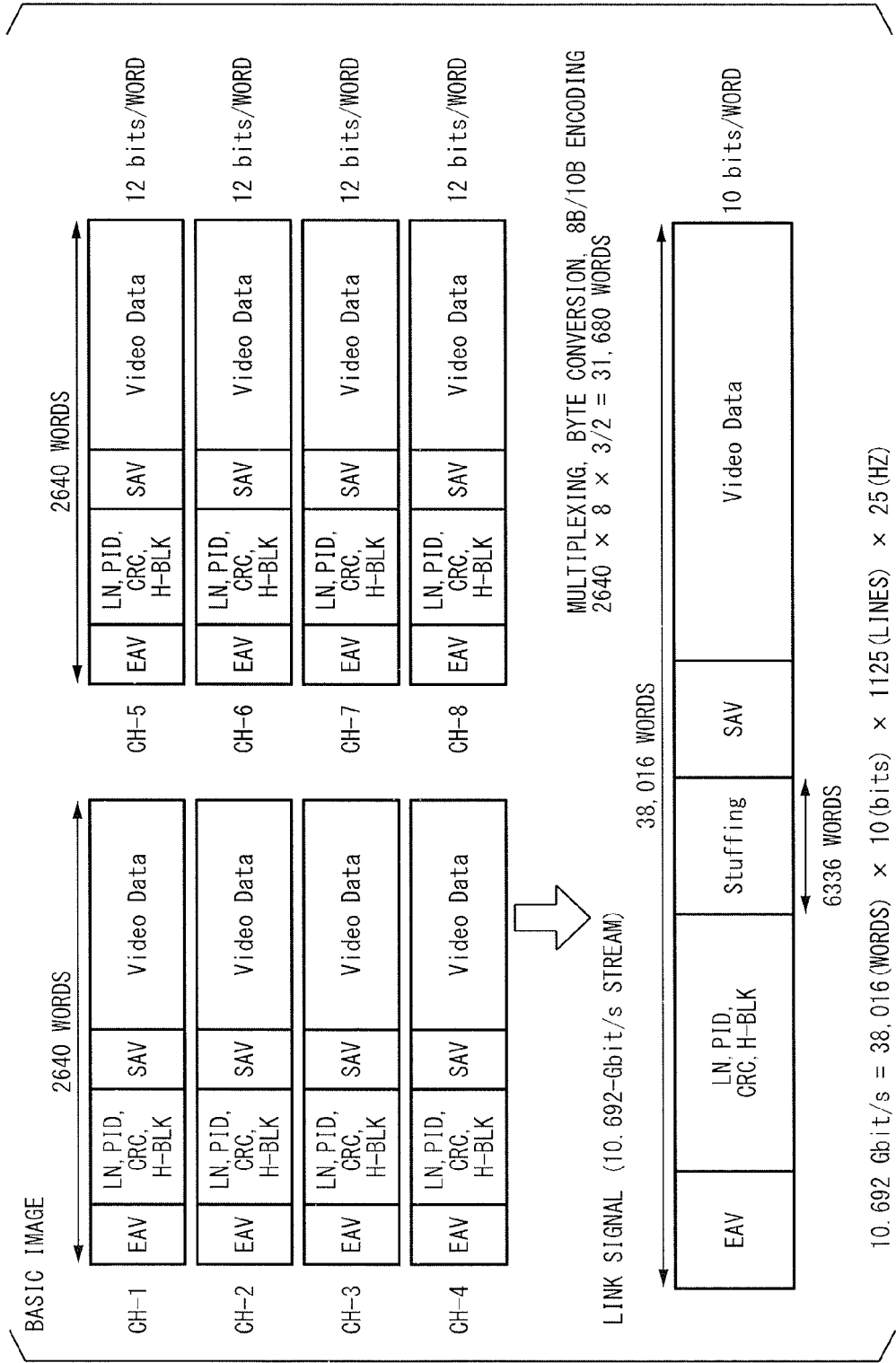
FIG. 39 is a drawing describing the processing by the link signal generation unit according to a first variation example of the fourth embodiment.

The case of the source image of a video signal having 8 k×4 k pixels and operating at a frame frequency of 25 Hz will be described as the first variation example of the fourth embodiment. In the first variation example of the fourth embodiment, the processing described in FIG. 38 is used in place of the processing described by FIG. 36. In the first variation example of the fourth embodiment, the signals shown in FIG. 39 are used in place of the signal shown in FIG. 37.

FIG. 38 describes the processing by the basic stream generation unit 13 according to the first variation example of the fourth embodiment of the present invention (corresponding to step S304 shown in FIG. 3). The basic stream generation unit 13 extracts pixels for each line in the lateral direction (horizontal direction) with respect to the basic images having 2 k×1 k pixels. The basic stream generation unit 13 then adds to the extracted pixel data timing reference signals, such as the control data EAV (end of active video), supplemental data, and SAV (start of active video), by line, so as to constitute a basic stream having a total length of 2640 words.

In a basic stream shown in FIG. 38, in lines 1 to 41, EAV is placed in columns 1920 to 1923, supplemental data is placed in columns 1924 to 2635, SAV is placed in columns 2636 to 2639, and supplemental data is placed in columns 0 to 1919.

In a basic stream shown in FIG. 38, in lines 42 to 1121, EAV is placed in columns 1920 to 1923, supplemental data is placed in columns 1924 to 2635, SAV is placed in columns 2636 to 2639, and the basic image is placed in columns 0 to 1919.

In the basic stream shown in FIG. 38, in lines 1122 to 1125, EAV is placed in columns 1920 to 1923, supplemental data is placed in columns 1924 to 2635, SAV is placed in columns 2636 to 2639, and supplemental data is placed in columns 0 to 1919.

FIG. 39 describes the processing by the link signal generation unit 14 in the first variation example of the fourth embodiment of the present invention (step S4705 shown in FIG. 35). The link signal generation unit 14 inputs eight basic streams of CH-1 to CH-8, corresponding to eight different basic images, and subjects one word of data of each basic stream to multiplexing processing (corresponding to step S3001 of FIG. 30). The multiplexing processing is performed successively by individual words from the leading part to the trailing part of the basic streams. The word length of a basic stream in the first variation example of the fourth embodiment is 2640 words.

In all of the eight basic streams of CH-1 to CH-8 of FIG. 39, data is included in the sequence of "EAV", "LN, PID, CRC, H-BLK", "SAV", and "video data".

The link signal generation unit 14 subjects the eight words of multiplexed data to arrangement processing by byte conversion to generate a total of 12 words of data having eight bits per word (corresponding to step S3002 of FIG. 30). The link signal generation unit 14 subjects each of the data of the total of 12 words of data having eight bits per word to 8B/10B encoding processing to generate data of a total of 12 words having 10 bits per word (corresponding to step S3003 of FIG. 30). The link signal generation unit 14 performs processing corresponding to step S3001 to step S3003 of FIG. 30 from the leading part to the trailing part of the basic streams of CH-1 to CH-8 to generate 31,680 (=2640×8×3/2) words of data having 10 bits per word, adds thereto 6336 words of stuffing data, and, as shown in FIG. 39, generates a 10.692-Gbit/s (=38,016 words×10 bits×1125 lines×25 Hz) link signal having 38,016 words per line.

In FIG. 39, data is included in the link signal in the sequence of "EAV", "LN, PID, CRC, H-BLK", "SAV", and "video data".

Figure 40:
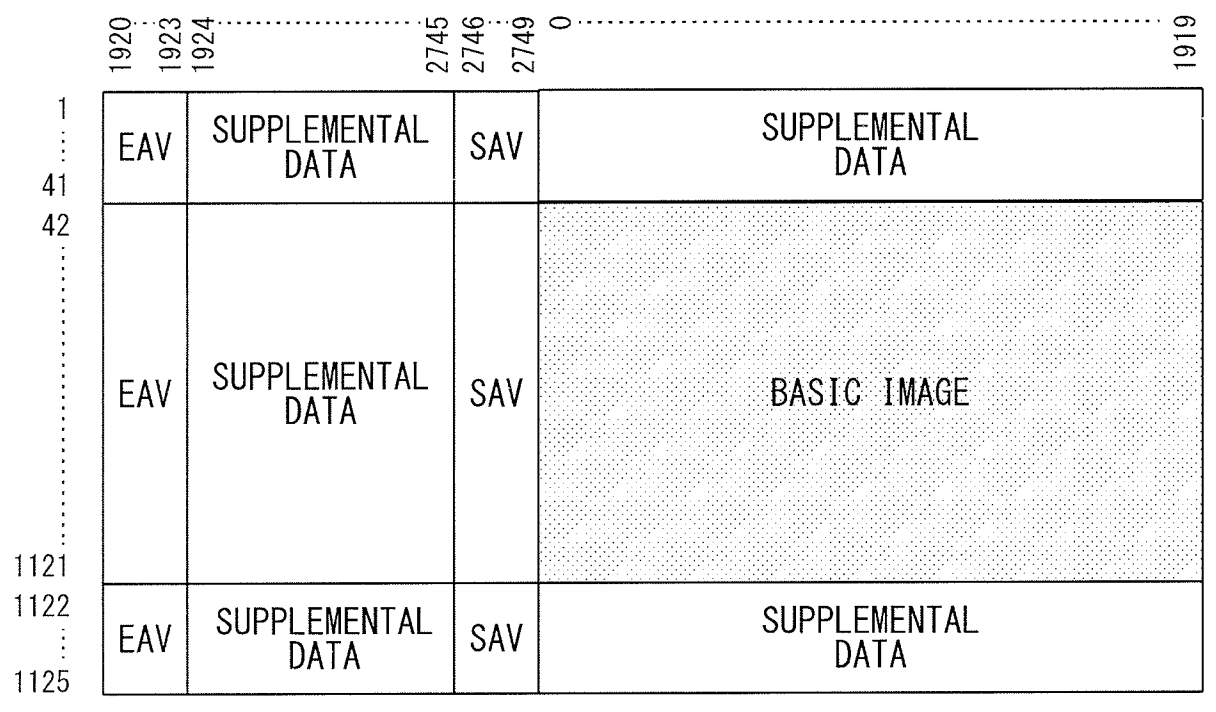

The case of the source image of a video signal having 8 k×4 k pixels and operating at a frame frequency of 24 Hz will be described as the second variation example of the fourth embodiment. In the second variation example of the fourth embodiment, the processing described in FIG. 40 is performed in place of the processing described by FIG. 36. In the second variation example of the fourth embodiment, the processing described in FIG. 41 is performed in place of the processing described by FIG. 37.

FIG. 40 describes the processing by the basic stream generation unit 13 according to the second variation example of the fourth embodiment of the present invention (corresponding to step S304 shown in FIG. 3). The basic stream generation unit 13 extracts pixels for each line in the lateral direction (horizontal direction) with respect to the basic images having 2 k×1 k pixels. The basic stream generation unit 13 then adds to the extracted pixel data timing reference signals such as the control data EAV (end of active video), supplemental data, and SAV (start of active video), by line, so as to constitute a basic stream having a total length of 2750 words.

In a basic stream shown in FIG. 40, in lines 1 to 41, EAV is placed in columns 1920 to 1923, supplemental data is placed in columns 1924 to 2745, SAV is placed in columns 2646 to 2749, and supplemental data is placed in columns 0 to 1919.

In a basic stream shown in FIG. 40, in lines 42 to 1121, EAV is placed in columns 1920 to 1923, supplemental data is placed in columns 1924 to 2745, SAV is placed in columns 2746 to 2749, and the basic image is placed in columns 0 to 1919.

In the basic stream shown in FIG. 40, in lines 1122 to 1125, EAV is placed in columns 1920 to 1923, supplemental data is placed in columns 1924 to 2745, SAV is placed in columns 2746 to 2749, and supplemental data is placed in columns 0 to 1919.

FIG. 41 describes the processing by the link signal generation unit 14 in the second variation example of the fourth embodiment of the present invention (step S4705 shown in FIG. 35). The link signal generation unit 14 inputs eight basic streams of CH-1 to CH-8, corresponding to eight different basic images, and subjects one word of data of each basic stream to multiplexing processing (corresponding to step S3001 of FIG. 30). The multiplexing processing is performed successively for each word, from the leading part to the trailing part of the basic streams. The word length of a basic stream in the second variation example of the fourth embodiment is 2750 words.

In all of the eight basic streams of CH-1 to CH-8 of FIG. 41, data is included in the sequence of "EAV", "LN, PID, CRC, H-BLK", "SAV", and "video data".

The link signal generation unit 14 subjects the eight words of multiplexed data to arrangement processing by byte conversion to generate a total of 12 words of data having eight bits per word (corresponding to step S3002 of FIG. 30). The link signal generation unit 14 then subjects each of the data of the total of 12 words of data having eight bits per word to 8B/10B encoding processing to generate data of a total of 12 words having 10 bits per word (corresponding to step S3003 of FIG. 30). The link signal generation unit 14 performs processing corresponding to step S3001 to step S3003 of FIG. 30 from the leading part to the trailing part of the basic streams of CH-1 to CH-8 to generate 33,000 (=2750×8×3/2) words of data having 10 bits per word, adds thereto 6600 words of stuffing data, and, as shown in FIG. 41, generates a 10.692-Gbit/s (=39,600 words×10 bits×1125 lines×24 Hz) link signal having 39,600 words per line.

In FIG. 41, data is included in the link signal in the sequence of "EAV", "LN, PID. CRC, H-BLK", "SAV", and "video data".

Both the first and the second variation examples of the fourth embodiment achieve the same effect as the fourth embodiment.

Fifth Embodiment

Next, the fifth embodiment of the present invention will be described. The descriptions of the constituent elements and parts used in processing in the fifth embodiment that are the same as in the above-described embodiments will be omitted.

In the fifth embodiment, because the mapping procedure is the same as in FIG. 31, the drawings thereof will be omitted and the parts that are different will be described.

The description of the fifth embodiment will be for the case in which the source image of the video signal has 4 k×2 k pixels and operates at a frame frequency of 50 Hz. The processing of step S2702 by the sub-image generation unit 11 divides the 4 k×2 k source image into M 2 k×1 k sub-images, these 2 k×1 k sub-images corresponding to basic images. The processing of step S2704 by the basic stream generation unit 13 generates basic streams from the basic images. That is, M corresponding basic streams are generated from M basic images. The processing of step S2705 by the link signal generation unit 14 generates one link signal from the four basic streams, the link signal being transmitted at a speed of 10.692 Gbit/s. That is, L=M/4 link signals are generated from M basic streams.

The fifth embodiment also achieves the same effect as the second embodiment.

Sixth Embodiment

Next, the sixth embodiment of the present invention will be described. The descriptions of the constituent elements and parts used in processing in the six embodiment that are the same as in the above-described embodiments will be omitted.

In the sixth embodiment, the mapping procedure shown in FIG. 42 is used in place of the mapping procedure of FIG. 31 of the second embodiment.

FIG. 42 shows the mapping procedure in the sixth embodiment, for the case in which the source image of a video signal has 4 k×2 k pixels and operates at a frame frequency of 30 Hz. It is assumed here that, in the color signal components C1, C2, and C3 constituting the video signal, the source image of one frame has 8 k×4 k pixels and operates at a frame frequency of 30 Hz (30 frames per second).

As shown in FIG. 42, the processing of step S5702 by the sub-image generation unit 11 (corresponding to step S2702 of FIG. 27) generates M sub-images from the source image, the sub-images having 4 k×2 k pixels and operating at a frame frequency of 30 Hz. The sub-images in the sixth embodiment are the same as basic images. The processing of step S5704 by the basic stream generation unit 13 (corresponding to step S2704 of FIG. 27) generates basic streams from the sub-images. That is, M corresponding basic streams are generated from M sub-images. The processing of step S5705 by the link signal generation unit 14 (corresponding to the processing of step S2705 of FIG. 27) generates one link signal from eight basic streams, the link signal being transmitted at a speed of 10.692 Gbit/s. That is, L (=M/8) link signals are generated from M basic streams.

The sixth embodiment also achieves the same effect as the fourth and other embodiments.

Although the sixth embodiment has been described for the case in which the source image of the video signal has 4 k×2 k pixels and operates at a frame frequency of 30 Hz, this is not a restriction.

For example, the source image of the video signal may have 4 k×2 k pixels and operate at a frame frequency of 25 Hz or may have 4 k×2 k pixels and operate at a frame frequency of 24 Hz. In such modified cases as well, the same effect as the sixth embodiment can be achieved.

Although the first to sixth embodiments have been described for the cases in which the frame frequency of the video signal of a moving image is any one of 24 Hz, 25 Hz, 30 Hz, 50 Hz, 60 Hz, and 120 Hz, this is not a restriction. For example, the frame frequency of the video signal of a moving image may be 24×(1000/1001) Hz instead of 24 Hz, 30×(1000/1001) Hz instead of 30 Hz, 60×(1000/1001) Hz instead of 60 Hz, or 120×(1000/1001) Hz instead of 120 Hz.

Also, a normal computer can be used as the hardware constitution of the video signal transmitting device 1 and the video signal receiving device 2 according to the first to sixth embodiments of the present invention. The video signal transmitting device 1 and the video signal receiving device 2 are constituted by a computer having a CPU, a volatile storage medium such as RAM, a non-volatile storage medium such as ROM, and an interface or the like. The functions of the sub-image generation unit 11, the basic image generation unit 12, the basic stream generation unit 13, and the link signal generation unit 14 of the video signal transmitting device 1 are each implemented by having a CPU execute programs into which these functions are coded. The functions of the basic stream reproduction unit 21, the basic image reproduction unit 22, the sub-image reproduction unit 23, and the source image reproduction unit 24 of the video signal receiving device 2 are each implemented by having a CPU execute programs into which these functions are coded. These programs can be stored into and distributed by a storage medium such as a magnetic disk (Floppy (registered trademark) or hard disk or the like), an optical disk (CD-ROM, DVD, or the like), or a semiconductor memory or the like, and may be transmitted and received via a network.

Although the present invention has been described by citing the first to sixth embodiments, the present invention is not restricted to the first to sixth embodiments, and can be variously modified within the scope of the technical concept thereof. For example, in the above-described embodiments, the sub-image generation unit 11 and the basic image generation unit 12 of the video signal transmitting device 1 are made separate constituent elements, the sub-image generation unit 11 generating sub-images from a source image, and the basic image generation unit 12 generating basic images from sub-images. However, the sub-image generation unit 11 and the basic image generation unit 12 may be made one constituent element (basic image generation unit), this constituent element generating basic images directly from sub-images.

Also, although in the first embodiment the description has been for the case in which the number of pixels in the source image has been expressed as 8 k×4 k, the number of pixels in the sub-image has been expressed as 4 k×2 k, and the number of pixels in the basic image has been expressed as 2 k×1 k, the number of horizontal pixels in the respective images being 8192, 4096, and 2048, which are powers of 2, the present invention is not restricted to these values. For example, if the number of horizontal pixels of the respective images is 7680, 3840, and 1920, the length of the horizontal blacking period can be adjusted accordingly.

In the first embodiment, each of the pixels of the plurality of color signal components constituting the video signal was made 12 bits, and the basic stream generation unit 13 was made to generate basic streams having 12 bits per word from basic images having 12-bit pixels. However, each of the pixels of the plurality of color signal components constituting the video signal may be made 16 bits, and the basic stream generation unit 13 may be made to generate basic streams having 16 bits per word from basic images having 16-bit pixels. In this case, the link signal generation unit 14 performs 64B/66B encoding processing instead of 8B/10B encoding processing, so that the speed of the 10.692-Gbit/s link signal shown in FIG. 18 is not exceeded.

INDUSTRIAL APPLICABILITY

The present invention can be applied, in a transmission processing of the video signal, to a video signal transmitting device, a video signal receiving device, a video signal transmitting method, a video signal receiving method, a program, and a recording medium required to reduce the transmission capacity for a video signal having a format with a small number of pixels and to handle pathological conditions, without the need to reconstruct one pixel into a plurality of data words.

REFERENCE SYMBOLS

1 Video signal transmitting device
2 Video signal receiving device
3 Transmission path
11 Sub-image generation unit
12 Basic image generation unit
13 Basic stream generation unit
14 Link signal generation unit
21 Basic stream reproduction unit
22 Basic image reproduction unit
23 Sub-image reproduction unit
24 Source image reproduction unit

The invention claimed is:

1. A video signal transmitting device that, from a video signal of a moving image constituted by a prescribed number of color signal components, generates a prescribed number of link signals having a prescribed speed, and transmits the prescribed number of link signals, the video signal transmitting device comprising:
a basic image generation circuit that
extracts, for each of the prescribed number of color signal components, pixels constituting a frame of the prescribed number of color signal components at a uniform interval two-dimensionally, and
two-dimensionally arranges the extracted pixels in a prescribed arrangement to generate a prescribed number of color signal basic images;
a basic stream generation circuit that
extracts, for each of the prescribed number of color signal basic images, pixels of the prescribed number of color signal basic images generated by the basic image generation circuit in a prescribed sequence to generate a prescribed number of basic streams, the extraction being performed by extracting the pixels for each two-dimensional square image made of four pixels; and
a link signal generation circuit that
synthesizes the prescribed number of basic streams generated by the basic stream generation circuit, the prescribed number of basic streams being in the prescribed number of color signal components which are same or different each other,
encodes bit-length units of the synthesized prescribed number of basic streams to a different bit length, and
generates the prescribed number of link signals having a prescribed speed, the synthesis being successively performed for each word, from a leading part to a trailing part of the prescribed number of basic streams.

2. The video signal transmitting device according to claim 1, wherein with respect to the frame of the prescribed number of color signal components, the basic image generation circuit, in addition to mapping neighboring pixels on even-numbered lines alternately onto a first color signal sub-image and a second color signal sub-image, maps neighboring pixels on odd-numbered lines alternately onto a third color signal sub-image and a fourth color signal sub-image, and
performs a processing with respect to each of the mapped color signal sub-images, to map, in addition to the mapping of neighboring pixels on even-numbered lines alternately onto a first color signal basic image and a second color signal basic image, neighboring pixels on odd-numbered lines alternately onto a third color signal basic image and a fourth color signal basic image.

3. The video signal transmitting device according to claim 2, wherein
the basic image generation circuit generates the color signal sub-images, the number of which is in accordance with a format of the video signal of the moving image constituted by the prescribed number of color signal components.

4. The video signal transmitting device according to claim 1, wherein
one of 24 Hz, 25 Hz, 30 Hz, 50 Hz, 60 Hz, 120 Hz, 24×(1000/1001) Hz, 30×(1000/1001) Hz, 60×(1000/1001) Hz, and 120×(1000/1001) Hz is used as a frame frequency of the video signal of the moving image.

5. The video signal transmitting device according to claim 4, wherein
the link signal generation circuit:
synthesizes the prescribed number of basic streams, the number of which is in accordance with the frame frequency;
encodes first data to second data, the first data having eight bits per word of the synthesized prescribed number of basic streams, the second data having ten bits per word, the encoding being performed by performing 8B/10B encoding processing; and
generates the prescribed number of link signal signals having the prescribed speed.

6. The video signal transmitting device according to claim 5, wherein
the link signal generation circuit synthesizes such that the more the frame frequency increases, the more the prescribed number of basic streams decreases.

7. The video signal transmitting device according to claim 1, wherein
the link signal generation circuit:
successively extracts line data of pixels from the prescribed number of color signal basic images;
adds control data to the extracted line data of the pixels; and
generates the prescribed number of basic streams of a prescribed word length per one line with a prescribed number of bits per word.

8. The video signal transmitting device according to claim 1, wherein
the link signal generation circuit:
subjects the prescribed number of basic streams generated by the basic stream generation circuit to multiplexing processing;
subjects the multiplexing-processed prescribed number of basic streams to arrangement processing by byte conversion and 8B/10B encoding processing; and
generates the prescribed number of link signals having the prescribed speed.

9. The video signal transmitting device according to claim 1, wherein
the link signal generation circuit:
generates a first number of the prescribed number of link signals in a case of the video signal of a 4:2:0 or 4:2:2 format; and
generates a second number of the prescribed number of link signals in a case of the video signal of a 4:4:4 format,
wherein the first number is smaller than the second number.

10. A video signal receiving device that receives a prescribed number of link signals from a video signal transmitting device and reproduces a video signal of a moving image constituted by a prescribed number of color signal components, the video signal receiving device comprising:
a basic stream reproduction circuit that
decodes bit-length units of the prescribed number of link signals into a prescribed bit length, and
from one of the prescribed number of link signals, reproduces a prescribed number of basic streams in the prescribed number of color signal components which are same or different each other;
a basic image reproduction circuit, for each of the prescribed number of basic streams, that
extracts data of the video signal from the prescribed number of basic streams reproduced by the basic stream reproduction circuit, and
arranges the data of the video signal as pixels in a prescribed sequence to reproduce a prescribed number of color signal basic images; and
a source image reproduction circuit that
multiplexes in a prescribed sequence pixels of the prescribed number of color signal basic images reproduced by the basic image reproduction circuit, the prescribed number of color signal basic images being in the prescribed number of color signal components which are same each other,
reproduces a source image of the prescribed number of color signal components, the reproduction being performed by reproducing from the pixels, each two-dimensional square image made of four pixels, and
outputs as a video signal source images of a prescribed number of reproduced color signal components.

11. A non-transitory computer-readable recording medium including instructions that generate, from a video signal of a moving image constituted by a prescribed number of color signal components, a prescribed number of link signals having a prescribed speed, the instructions when executed by a computer of a video signal transmitting device, cause the computer to perform the plurality of functions including:
extract, for each of the prescribed number of color signal components, pixels constituting a frame of the prescribed number of color signal components at a uniform interval two-dimensionally;
two-dimensionally arrange the extracted pixels in a prescribed arrangement to generate a prescribed number of color signal basic images;
for each of the prescribed number of color signal basic images, extract pixels of the prescribed number of color signal basic images generated in a prescribed sequence to generate a prescribed number of basic streams, the extraction being performed by extracting the pixels for each two-dimensional square image made of four pixels;
synthesize the prescribed number of basic streams generated, the prescribed number of basic streams being in the prescribed number of color signal components which are same or different each other;
encode bit-length units of the synthesized prescribed number of basic streams to a different bit length; and
generate the prescribed number of link signals having a prescribed speed, the synthesis being successively performed for each word, from a leading part to a trailing part of the prescribed number of basic streams.

12. A non-transitory computer-readable recording medium including instructions that (i) receive a prescribed number of link signals from a video signal transmitting device and (ii) reproduce a video signal of a moving image constituted by a prescribed number of color signal components, the instructions when executed by a computer of a video signal receiving device, cause the computer to perform the plurality of functions including:
decode bit-length units of the prescribed number of link signals into a prescribed bit length;
from one of the prescribed number of link signals, reproduce a prescribed number of basic streams in the prescribed number of color signal components which are same or different each other;
for each of the basic streams,
extract data of the video signal from the prescribed number of basic streams reproduced;
arrange the data of the video signal as pixels in a prescribed sequence to reproduce a prescribed number of color signal basic images;
multiplex in a prescribed sequence pixels of the prescribed number of color signal basic images reproduced, the prescribed number of color signal basic images being in the prescribed number of color signal components which are same each other;
reproduce a source image of the prescribed number of color signal components, the reproduction being performed by reproducing, from the pixels, each two-dimensional square image made of four pixels; and
output as a video signal the source images of a prescribed number of reproduced color signal components.

* * * * *